(12) United States Patent
Hirano

(10) Patent No.: US 6,292,241 B1
(45) Date of Patent: Sep. 18, 2001

(54) REFLECTIVE LIQUID CRYSTAL DISPLAY APPARATUS WITH LOW MANUFACTURING COST

(75) Inventor: Naoto Hirano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/906,256

(22) Filed: Aug. 5, 1997

(30) Foreign Application Priority Data

Aug. 5, 1996 (JP) .................................................. 8-205712

(51) Int. Cl.$^7$ .................................................. G02F 1/1335
(52) U.S. Cl. ........................... 349/113; 349/47; 349/139; 349/148
(58) Field of Search ........................... 349/47, 162, 139, 349/148, 113

(56) References Cited

U.S. PATENT DOCUMENTS

| | | | |
|---|---|---|---|
| 4,519,678 | * | 5/1985 | Komatsubara et al. ............. 349/113 |
| 4,723,838 | * | 2/1988 | Aoki et al. ............................... 349/47 |
| 4,770,498 | * | 9/1988 | Aoki et al. ............................... 349/47 |
| 4,776,673 | * | 10/1988 | Aoki et al. ............................... 349/47 |
| 4,869,576 | * | 9/1989 | Aoki et al. ............................... 349/47 |
| 4,904,060 | * | 2/1990 | Grupp ...................................... 349/162 |
| 5,051,800 | * | 9/1991 | Shoji et al. ............................... 349/42 |
| 5,153,754 | * | 10/1992 | Whetten ................................... 349/148 |
| 5,288,591 | * | 2/1994 | Blonder .................................. 349/113 |
| 5,691,782 | * | 11/1997 | Nishikawa et al. ...................... 349/47 |
| 5,731,858 | * | 3/1998 | Hisatake et al. ........................ 349/112 |
| 5,757,449 | * | 5/1998 | Nishizaki et al. ...................... 349/104 |
| 5,796,455 | * | 8/1998 | Mizobata et al. ...................... 349/116 |

FOREIGN PATENT DOCUMENTS 6186544 7/1994 (JP) .
6230399 8/1994 (JP) .

OTHER PUBLICATIONS

Naohito Kimura, "A Color Version of Reflection Type LCD", Semiconductor World, pp. 108–112, Feb. 1995.

* cited by examiner

*Primary Examiner*—James A. Dudek
(74) *Attorney, Agent, or Firm*—Sughrue, Mion, Zinn, Macpeak & Seas, PLLC

(57) ABSTRACT

In a reflective liquid crystal apparatus, a drain electrode and a source electrode are formed on a insulating substrate and are formed by an aluminum alloy layer. The source electrode serves as a light reflecting pixel electrode. Also, a non-doped semiconductor layer is formed on a part of the drain electrode and a part of the source electrode, and impurity-doped semiconductor layers are formed between the drain and source electrodes and the non-doped semiconductor layer. Further, a gate electrode is formed via a gate insulating layer on the non-doped semiconductor layer. Additionally, a counter common electrode is formed on a transparent insulating substrate, and a liquid crystal layer is interposed between the insulating substrate and the transparent insulating substrate.

19 Claims, 51 Drawing Sheets

REFLECTIVE LIQUID CRYSTAL DISPLAY APPARATUS WITH LOW MANUFACTURING COST

BACKGROUND OF THE INVENTION

1. Field of the Invention

The present invention relates to a reflective liquid crystal display (LCD) apparatus.

2. Description of the Related Art

LCD apparatuses are divided into light penetration type LCD apparatuses requiring backlights and reflective LCD apparatuses reflecting environmental light.

In the reflective LCD apparatuses, in order to obtain high display quality, the effeciency of reflecting and scattering environmental light is important. Also, since available environmental light is limited, the loss of light has to be reduced. Particularly, in a colored LCD apparatus using color filters, the loss of light is large.

In a prior art reflective LCD apparatus (see Naohito Kimura, "Colored Reflection type LCD", Semiconductor World, pp. 108–112, February 1995), inverted staggered thin film transistors (TFTs) where gate electrodes are beneath amorphous silicon layers are formed on a glass substrate. Further, a photosensitive acrylic resin layer having an uneven surface is formed on the TFTs. Also, pixel electrodes made of aluminum are formed on the photosensitive acrylic resin layer and each of the pixel electrodes are connected to one of the source electrodes. A counter glass substrate is prepared, and a transparent common electrode is formed on the glass substrate.

After orientation processes including orientation layer coating processes and rubbing processes are performed upon the two substrates, the two substrates are adhered to each other with a predetermined spacing therebetween, and a liquid crystal layer is then inserted into this spacing. This will be explained later in detail.

In the prior art reflective LCD apparatus, since the photosensitive acrylic resin layer has an uneven surface, the pixel electrodes also have uneven surfaces, so that the pixel electrodes serve as optical reflecting means as well as optical scattering means. Therefore, the scattering characteristics of reflected light can be improved to make the brightness of reflected light uniform over a broad visual angle. In addition, since the pixel electrodes are formed over the TFTs, effective use can be made of reflected light, thus increasing the numerical aperture. Further, if guest-host (G-H) liquid crystal which does not require polarization plates is used, a brighter display can be obtained.

In order to manufacture the prior art reflective LCD apparatus, however, a large number of photolithography and etching processes are required due to the complex configuration of the pixel electrodes, thus increasing the manufacturing cost.

SUMMARY OF THE INVENTION

It is an object of the present invention to reduce the manufacturing cost of a reflective LCD apparatus.

According to the present invention, in a reflective liquid crystal apparatus, a drain electrode and a source electrode are formed on a insulating substrate and are formed by an aluminum alloy layer. The source electrode serves as a light reflecting pixel electrode. Also, a non-doped semiconductor layer is formed on a part of the drain electrode and a part of the source electrode, and impurity-doped semiconductor layers are formed between the drain and source electrodes and the non-doped semiconductor layer. Further, a gate electrode is formed via a gate insulating layer on the non-doped semiconductor layer. In addition, a counter common electrode is formed on a transparent insulating substrate, and a liquid crystal layer is interposed between the insulating substrate and the transparent insulating substrate.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, a prior art reflective LCD apparatus will be explained next with reference to FIG. 1 (see Naohito Kimura, "Colored Reflection type LCD", Semiconductor World, pp. 108–112, February 1995).

Figure 1:
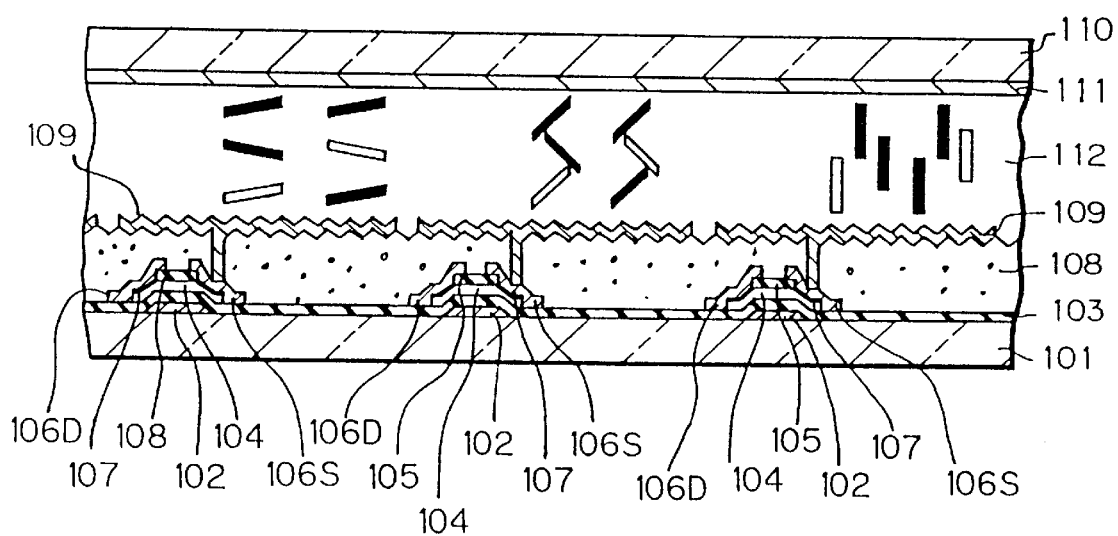
FIG. 1 is a cross-sectional view illustrating a prior art reflective LCD apparatus.

In FIG. 1, a conductive layer 102 made of Cr or the like is formed on a glass substrate 101, and is patterned to form gate electrodes. Then, a gate insulating layer 103 made of silicon nitride is formed on the gate electrodes 102. Also, an amorphous silicon layer 104 is formed as a semiconductor layer on the gate insulating layer 103, and a passivation layer 105 is formed on the amorphous silicon layer 104. Further, a conductive layer is formed thereon and is patterned to form drain electrodes 106D and source electrodes 106S. Also, $N^+$-type regions 107 are formed between the amorphous silicon layer 104 and the drain electrodes 106D (the source electrodes 106S). Thus, inverted staggered TFTs where the gate electrodes 102 are beneath the amorphous silicon layer 104 are formed.

Further, a photosensitive acrylic resin layer 108 having an uneven surface is formed on the TFTs. Also, pixel electrodes 109 made of aluminum are formed on the photosensitive acrylic resin layer 108 and each of the pixel electrodes 109 is connected to one of the source electrodes 106S.

In addition, a counter glass substrate 110 is prepared, and a transparent common electrode 111 is formed on the glass substrate 110.

After orientation processes including orientation layer coating processes and rubbing processes are performed upon the two substrates 101 and 110, the two substrates 101 and 110 are adhered to each other with a predetermined spacing therebetween and then, a liquid crystal layer 112 is inserted into this spacing.

In FIG. 1, since the photosensitive acrylic resin layer 108 has an uneven surface, the pixel electrodes 109 also have uneven surfaces, so that the pixel electrodes 109 serve as optical reflecting means as well as optical scattering means. Therefore, the scattering characteristics of reflected light can be improved to make the brightness of reflected light uniform over a broad visual angle. In addition, since the pixel electrodes 109 are formed over the TFTs, effective use can be made of reflected light, thus increasing the numerical aperture. Further, if guest-host (G-H) liquid crystal which does not require polarization plates is used, a brighter display can be obtained.

In order to manufacture the reflective LCD apparatus of FIG. 1, however, a large number of photolithography and eching processes, i.e., five processes in this case, are required due to the complex configuration of the pixel electrodes 109, thus increasing the manufacturing cost.

A first embodiment of the method for manufacturing a reflective LCD apparatus according to the present invention will be explained next with reference to FIGS. 2A through 2G.

Figure 2A:
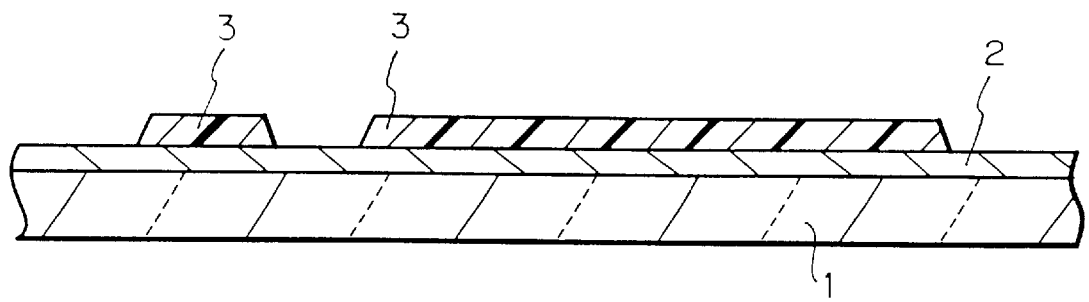
FIGS. 2A through 2G are cross-sectional views illustrating a first embodiment of the reflective LCD apparatus according to the present invention.

First, referring to FIG. 2A, an about 100 nm thick Al—Nd—Si alloy layer 2 is deposited by a sputtering process on a glass substrate 1. Then, a photoresist pattern 3 corresponding to a drain electrode and a source (pixel) electrode is formed by a photolithography process.

Figure 2B:
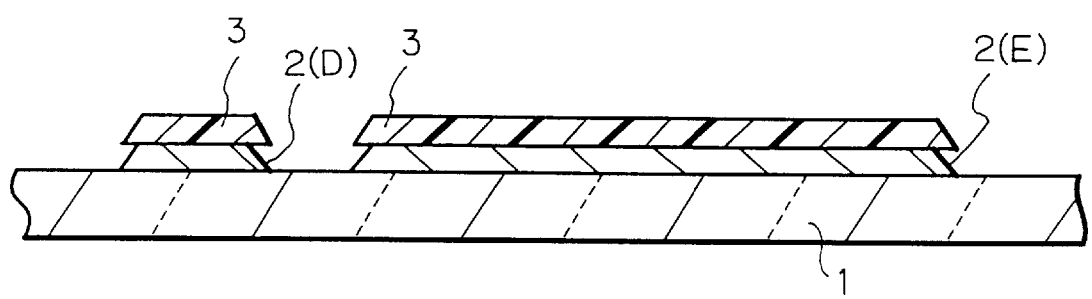

Next, referring to FIG. 2B, the aluminum alloy layer 2 is etched by a wet etching process using a phosphoric acid/nitric acid solution with a mask of the photoresist pattern 3. As a result, a drain electrode 2(D) and a pixel electrode 2(E) are formed by the aluminum layer 2. In this case, the side edges of the drain electrode 2(D) and the pixel electrode 2(E) are tapered. Note that, if a dry etching process using $Cl_2$ gas is performed upon the aluminum alloy layer 2, the side edges of the drain electrode 2(D) and the pixel electrode 2(E) are not tapered.

Figure 2C:
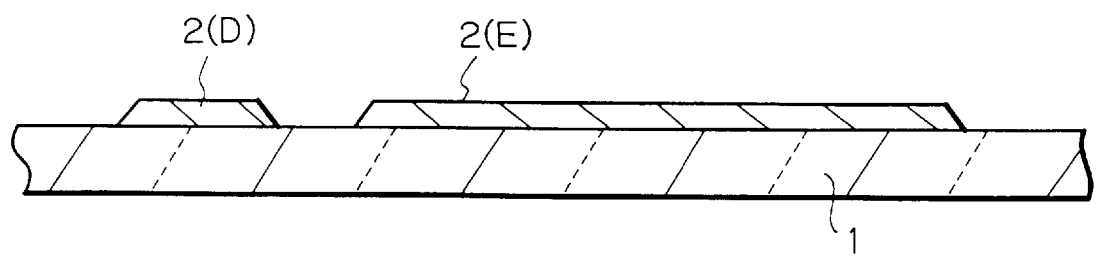

Next, referring to FIG. 2C, the photoresist pattern 3 is removed.

Figure 2D:
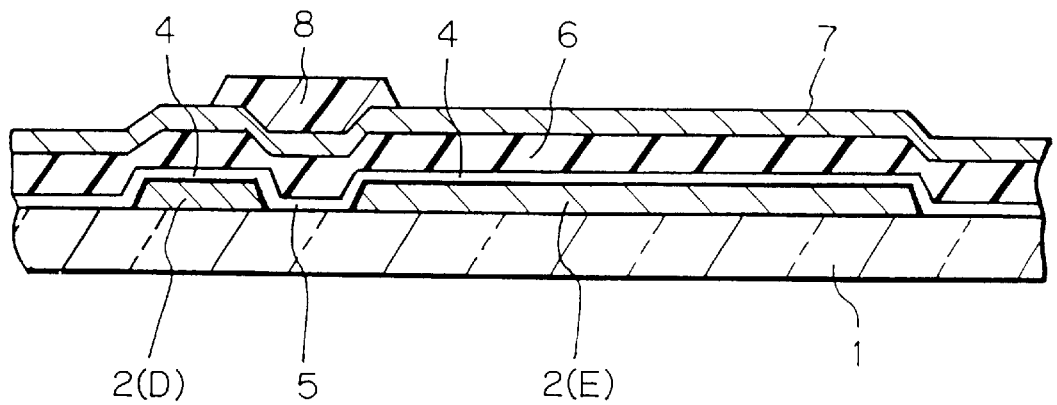

Next, referring to FIG. 2D, a thin natural oxide layer (not shown) formed on the drain electrode 2(D) and the pixel electrode 2(E) is etched by a sputtering process using inert gas or by a chemical etching process using halogen gas. Immediately after that, a phosphor rich amorphous silicon layer, i.e., an about 5 nm thick $N^-$-type amorphous silicon layer 4 is deposited by a PCVD process using $PH_3$ (phosphin) gas added by a very small amount of $SiH_4$ (monosilane) gas only on the drain electrode 2(D) and the pixel electrode 2(E). Note that the $N^+$-type amorphous silicon layer 4 can be formed by a $PH_3$ plasma-doping process.

Subsequently, an about 50 nm thick I-type (non-doped) amorphous silicon layer 5 is deposited by a PCVD process using $SiH_4$ gas and $H_2$ gas on the entire surface. In addition, an about 300 nm thick silicon nitride layer 6 serving as a gate insulating layer is deposited by a PCVD process using $SiH_4$ gas, $NH_3$ gas and $N_2$ gas. Note that all the above-mentioned PCVD processes are carried out in the same PCVD apparatus.

Then, an about 100 nm thick Al—Nd—Si alloy layer 7 is deposited by a sputtering process on the silicon nitride layer 6. Then, a photoresist pattern 3A corresponding to a gate electrode is formed on the aluminum alloy layer 7.

Figure 2E:
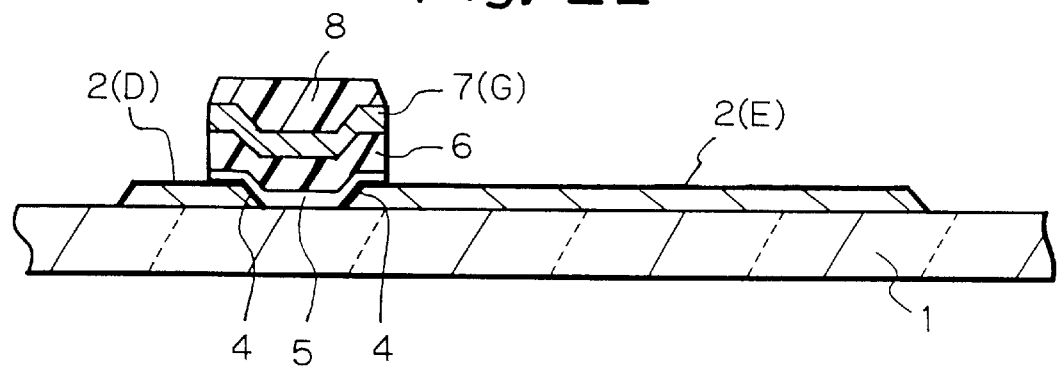

Next, referring to FIG. 2E, the aluminum alloy layer 7 is etched by a wet etching process using phosphoric acid/nitric acid solution with a mask of the photoresist pattern 3A to form a gate electrode 7(G). Note that the aluminum alloy layer 7 can be etched by a dry etching process using $Cl_2$ gas. Then, the silicon nitride layer 6, the I-type amorphous silicon layer 5, and the $N^-$-type amorphous silicon layer 4 are sequentially etched by a dry etching process using $CF_4$ gas and $O_2$ gas with a mask of the photoresist pattern 3A. Thus, an island is formed. Also, since the aluminum alloy layer 2 is not etched by the above-mentioned dry etching process using fluorine gas, the drain electrode 2(D) and the pixel electrode 2(E) outside of the island are exposed.

Figure 2F:
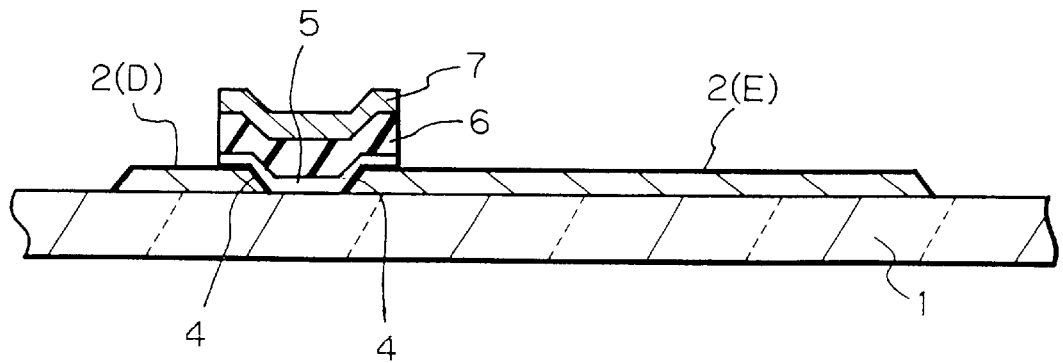

Next, referring to FIG. 2F, the photoresist pattern 3A is removed. Thus, the island for a staggered TFT where the gate electrode 7(G) is below the amorphous silicon layer 5 is formed.

Figure 2G:
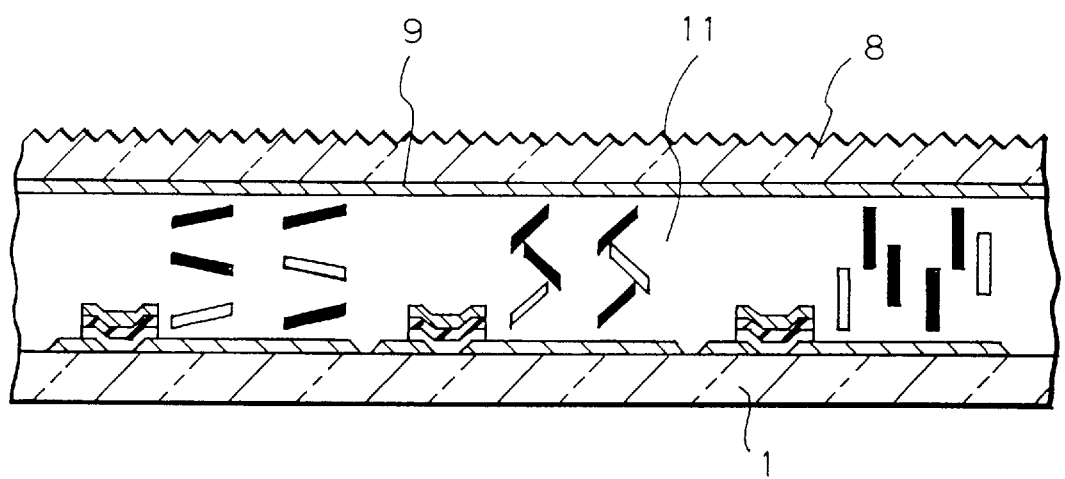

Finally, referring to FIG. 2G, a counter glass substrate 8 having an uneven (rough) surface is prepared. For example, the surface of the glass substrate 8 is made uneven by using a sand blast method. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing. Then, the device is sealed by an ultraviolet-setting resin.

In the first embodiment as illustrated in FIGS. 2A through 2G, only two photolithography and etching processes are carried out, thus reducing the manufacturing cost.

Also, in FIGS. 2A through 2G, since Si, which is the same component as in the $N^+$-type amorphous silicon layer 4 and the amorphous silicon layer 6, is included in the aluminum alloy layers 2 and 7, the diffusion of aluminum atom and silicon atoms can be suppressed, thus avoiding the deterioration of the characteristics of the TFT. In addition, since Nd is included in the aluminum alloy layers 2 and 7, the high temperature resistance and anti-electromigration characteristics of the aluminum alloy layers 2 and 7 can be improved. Further, incident light is scattered at the counter glass substrate 8, and penetrates the liquid crystal layer 11. Then, the light is reflected by the pixel electrode 2(E), and is further scattered at the counter glass substrate 8. In this case, the transmittance of the light through the liquid crystal layer 11 is controlled by the liquid crystal layer 11. Further, since the liquid crystal layer 11 uses guest-host liquid crystal where a color pigment (guest) is mixed into twisted-neumatic (TN) liquid crystal (host) and the absortion of light by the guest is controlled by the viscosity of the host, the polarization plates are unnecessary and a bright display can be obtained.

A second embodiment of the method for manufacturing a reflective LCD apparatus according to the present invention will be explained next with reference to FIGS. 3A through 3G.

Figure 3A:
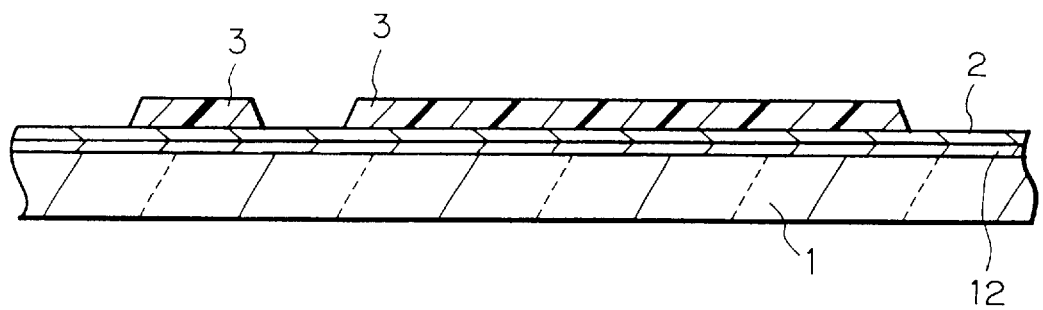
FIGS. 3A through 3G are cross-sectional views illustrating a second embodiment of the reflective LCD apparatus according to the present invention.

First, referring to FIG. 3A, an about 20 nm thick Mo layer 12 is deposited by a sputtering process on a glass substrate 1. Then, an about 80 nm thick Al—Nd—Si alloy layer 2 is deposited by a sputtering process on the Mo layer 12. Then, a photoresist pattern 3 corresponding to a drain electrode and a source (pixel) electrode is formed by a photolithography process.

Figure 3B:
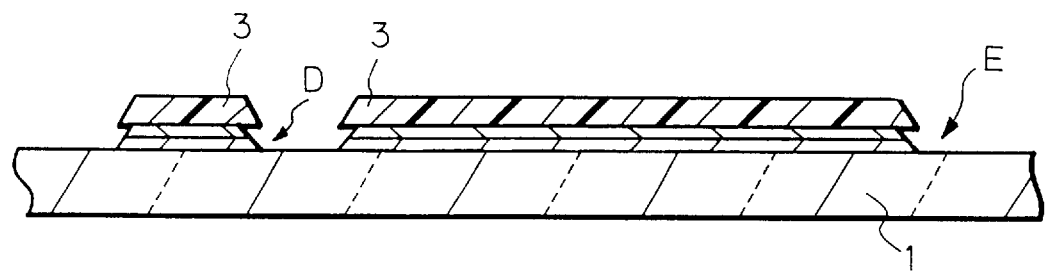

Next, referring to FIG. 3B, the aluminum alloy layer 2 and the Mo layer 12 are etched by a wet etching process using phosphoric acid/nitric acid solution with a mask of the photoresist pattern 3. As a result, a drain electrode D and a pixel electrode E are formed by the aluminum layer 2 and the Mo layer 2. In this case, the side edges of the drain electrode D and the pixel electrode E are tapered. Note that, if a dry etching process using $Cl_2$ gas is performed upon the aluminum alloy layer 2 and the Ho layer 12, the side edges of the drain electrode D and the pixel electrode E are not tapered.

Figure 3C:
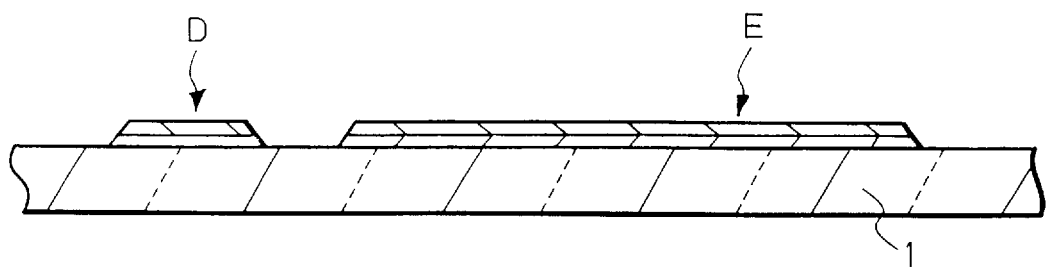

Next, referring to FIG. 3C, the photoresist pattern 3 is removed.

Figure 3D:
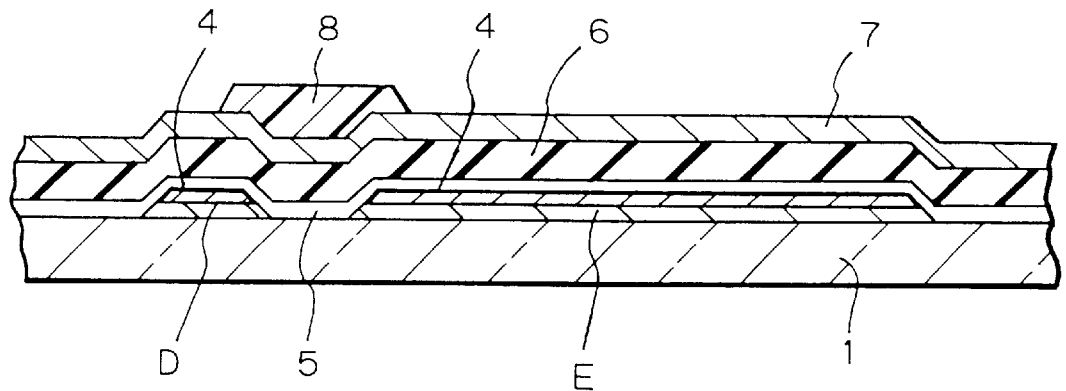

Next, referring to FIG. 3D, a phosphor rich amorphous silicon layer, i.e., an about 5 nm thick $N^+$-type amorphous silicon layer 4 is deposited by a PCVD process using $PH_3$ gas added by a very small amount of $SiH_4$ gas only on the drain electrode D and the pixel electrode E. Note that the $N^+$-type amorphous silicon layer 4 can be formed by a $PH_3$ plasma-doping process.

Subsequently, an about 50 nm thick I-type (non-doped) amorphous silicon layer 5 is deposited by a PCVD process using $SiH_4$ gas and $H_2$ gas on the entire surface. In addition, an about 300 nm thick silicon nitride layer 6 serving as a gate insulating layer is deposited by a PCVD process using $SiH_4$ gas, $NH_3$ gas and $N_2$ gas. Note that all the above-mentioned PCVD processes are carried out in the same PCVD apparatus.

Then, an about 100 nm thick Al—Nd—Si alloy layer 7 is deposited by a sputtering process on the silicon nitride layer 6. Then, a photoresist pattern 3A corresponding to a gate electrode is formed on the aluminum alloy layer 7.

Figure 3E:
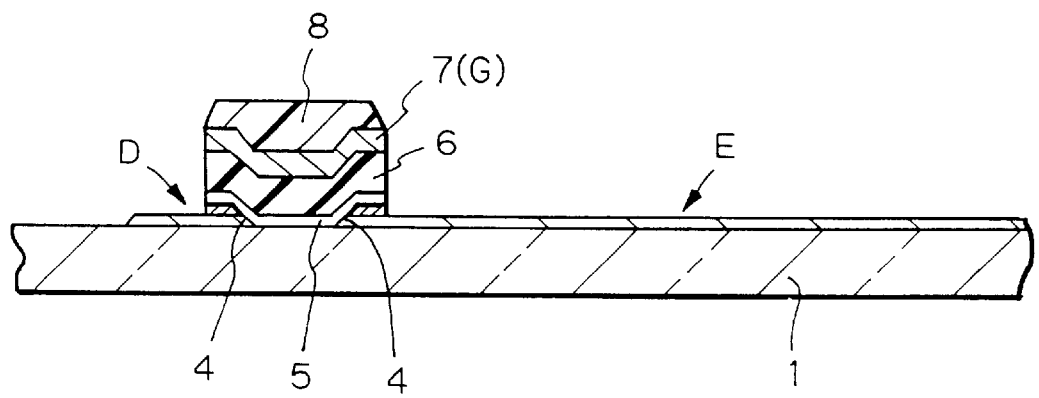

Next, referring to FIG. 3E, the aluminum alloy layer 7 is etched by a wet etching process using phosphoric acid/nitric acid solution with a mask of the photoresist pattern 3A to form a gate electrode 7(G). Note that the aluminum alloy layer 7 can be etched by a dry etching process using $Cl_2$ gas. Then, the silicon nitride layer 6, the I-type amorphous silicon layer 5, and the $N^+$-type amorphous silicon layer 4 are sequentially etched by a dry etching process using $CF_4$ gas and $O_2$ gas with a mask of the photoresist pattern 8. Thus, an island is formed. Also, since the aluminum alloy layer 2 is not etched by the above-mentioned dry etching process using fluorine gas, the drain electrode D and the pixel electrode E outside of the island are exposed.

Figure 3F:
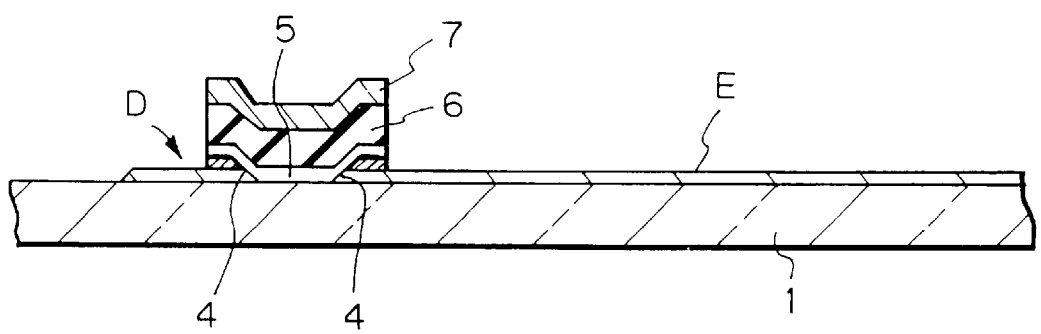

Next, referring to FIG. 3F, the photoresist pattern 3A is removed. Thus, the island for a staggered TFT where the gate electrode 7(G) is below the amorphous silicon layer 5 is formed.

Figure 3G:
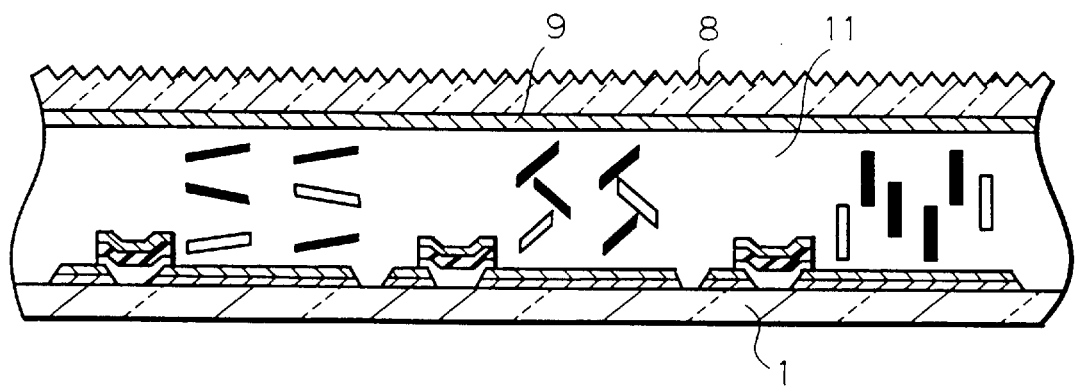

Finally, referring to FIG. 3G, a counter glass substrate 8 having an uneven surface is prepared. For example, the surface of the glass substrate 8 is made uneven by using a sand blast method. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing, and the device is sealed by an ultraviolet-setting resin.

Also, in the first embodiment, the aluminum alloy layer 2 has a bad ohmic contact characteristic to the $N^+$-type amorphous silicon layer 4, while in the second embodiment, the Mo layer 12 has good ohmic contact characteristics to the aluminum alloy layer 2 and the $N^+$-type amorphous silicon layer 4. Therefore, the aluminum alloy layer 2 can be electrically connected effectively via the Mo layer 12 to the $N^+$-type amorphous silicon layer 4.

In the second embodiment as illustrated in FIGS. 3A through 3G, although a step for forming the Mo layer 12 as an ohmic contact material for th $N^+$-type amorphous silicon layer 4 is added to the first embodiment, only two photolithography and etching processes are carried out. In addition, the Mo layer 12 and the aluminum alloy layer 2 are sequentially formed in the same sputtering apparatus. Therefore, the manufacturing cost can be reduced.

Also, in FIGS. 3A through 3G, in the same way as in FIGS. 2A through 2G, the diffusion of aluminum atoms and silicon atoms can be suppressed, thus avoiding the deterioration of the characteristics of the TFT. In addition, the high temperature resistance and anti-electromigration characteristics of the aluminum alloy layers 2 and 7 can be improved. Further, polarization plates are unnecessary and a bright display can be obtained.

A third embodiment of the method for manufacturing a reflective LCD apparatus according to the present invention will be explained next with reference to FIGS. 4A through 4G.

Figure 4A:
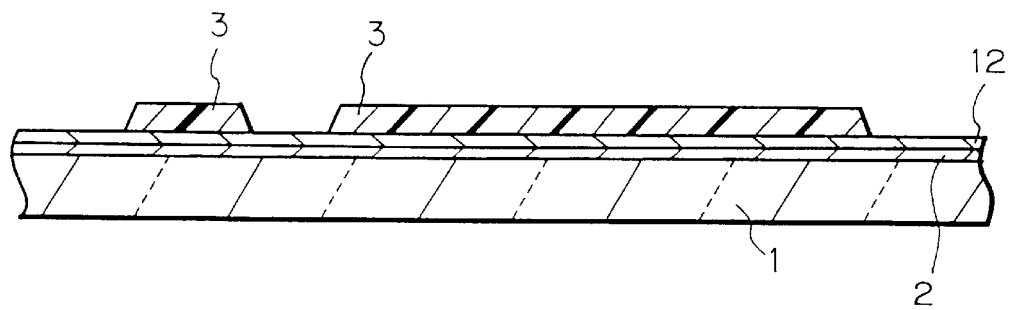
FIGS. 4A through 4G are cross-sectional views illustrating a third embodiment of the reflective LCD apparatus according to the present invention.

First, referring to FIG. 4A, an about 80 nm thick Al—ND—Si alloy layer 2 is deposited by a sputtering process on a glass substrate 1. Then, an about 20 nm thick Mo layer 12 is deposited by a sputtering process on the aluminum alloy layer 2. Then, a photoresist pattern 3 corresponding to a drain electrode and a source (pixel) electrode is formed by a photolithography process.

Figure 4B:
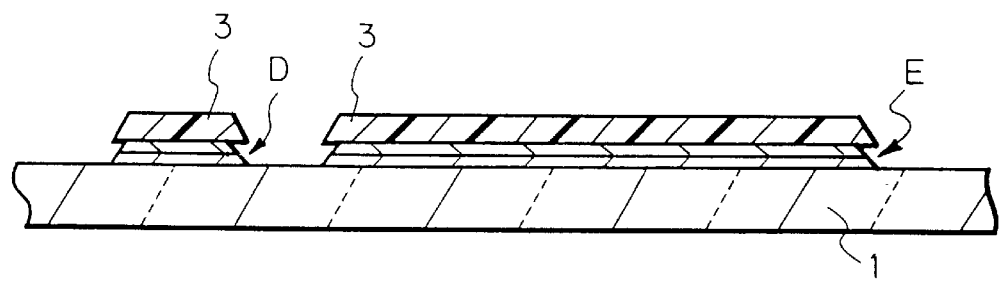

Next, referring to FIG. 4B, the Mo layer 12 and the aluminum alloy layer 2 are etched by a wet etching process using a phosphoric acid/nitric acid solution with a mask of the photoresist pattern 3. As a result, a drain electrode D and a pixel electrode E are formed by the Mo layer 12 and the aluminum alloy layer 2. In this case, the side edges of the drain electrode D and the pixel electrode E are tapered. Note that, if a dry etching process using $Cl_2$ gas is performed upon the Mo layer 12 and the aluminum alloy layer 2, the side edges of the drain electrode D and the pixel electrode E are not tapered.

Figure 4C:
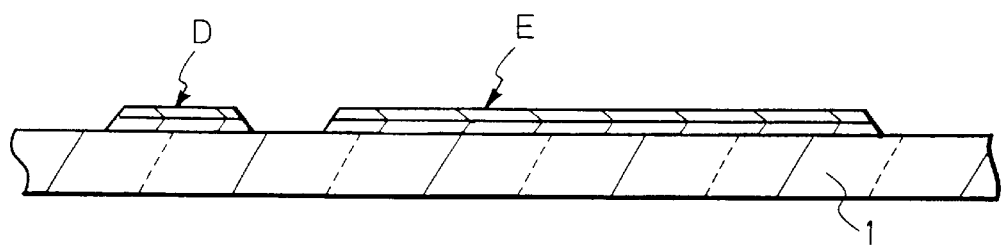

Next, referring to FIG. 4C, the photoresist pattern 3 is removed.

Figure 4D:
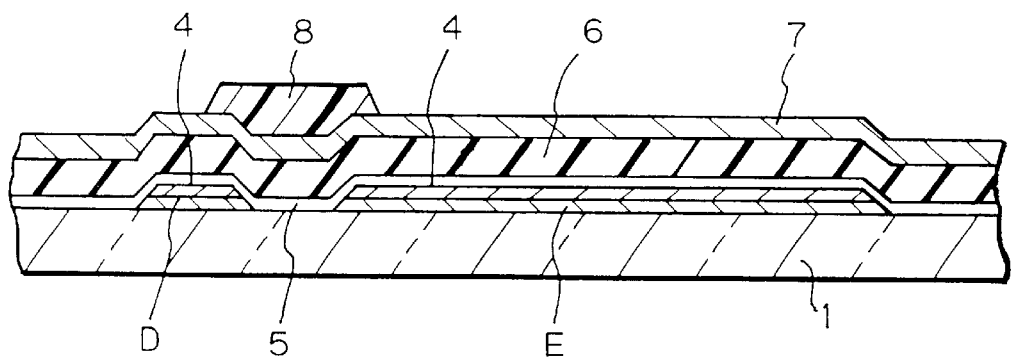

Next, referring to FIG. 4D, a phosphor rich amorphous silicon layer, i.e., an about 5 nm thick $N^+$-type amorphous silicon layer 4 is deposited by a PCVD process using $PH_3$ gas added by a very small amount of $SiH_4$ gas only on the drain electrode D and the pixel electrode E. Note that the $N^+$-type amorphous silicon layer 4 can be formed by a $PH_3$ plasma-doping process.

Subsequently, an about 50 nm thick I-type (non-doped) amorphous silicon layer 5 is deposited-by a PCVD process using $SiH_4$ gas and $H_2$ gas on the entire surface. In addition, an about 300 nm thick silicon nitride layer 6 serving as a gate insulating layer is deposited by a PCVD process using $SiH_4$ gas, $NH_3$ gas and $N_2$ gas. Note that all the above-mentioned PCVD processes are carried out in the same PCVD apparatus.

Then, an about 100 nm thick Al—Nd—Si alloy layer 7 is deposited by a sputtering process on the silicon nitride layer 6. Then, a photoresist pattern 3A corresponding to a gate electrode is formed on the aluminum alloy layer 7.

Figure 4E:
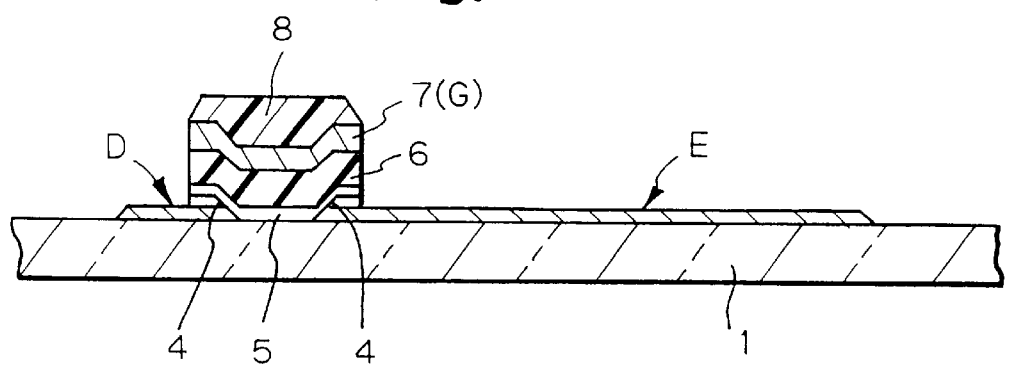

Next, referring to FIG. 4E, the aluminum alloy layer 7 is etched by a wet etching process using a phosphoric acid/nitric acid solution with a mask of the photoresist pattern 3A to form a gate electrode 7(G). Note that the aluminum alloy layer 7 can be etched by a dry etching process using $Cl_2$ gas. Then, the silicon nitride layer 6, the I-type amorphous silicon layer 5, the $N^+$-type amorphous silicon layer 4 and the Mo layer 12 are sequentially etched by a dry etching process using $CF_4$ gas and $O_2$ gas with a mask of the photoresist pattern 3A. Thus, an island is formed. Also, since the Mo layer 12 is etched but the aluminum alloy layer 2 is not etched by the above-mentioned dry etching process using fluorine gas, the drain electrode D and the pixel electrode E outside of the island are exposed.

Figure 4F:
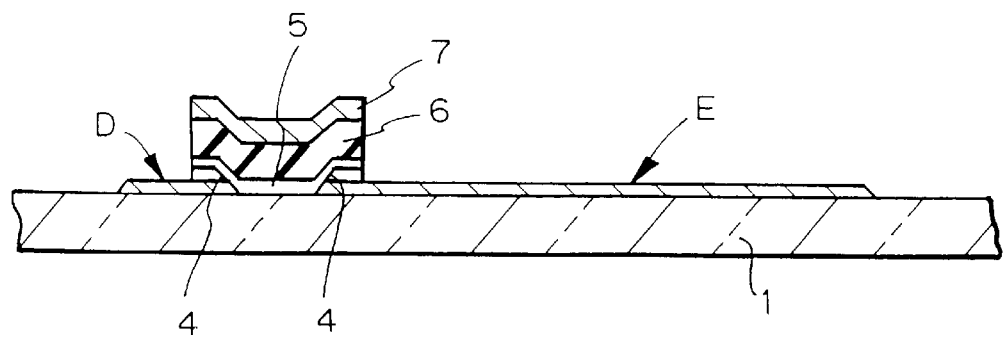

Next, referring to FIG. 4F, the photoresist pattern 3A is removed. Thus, the island for a staggered TFT where the gate electrode 7(G) is below the amorphous silicon layer 5 is formed.

Figure 4G:
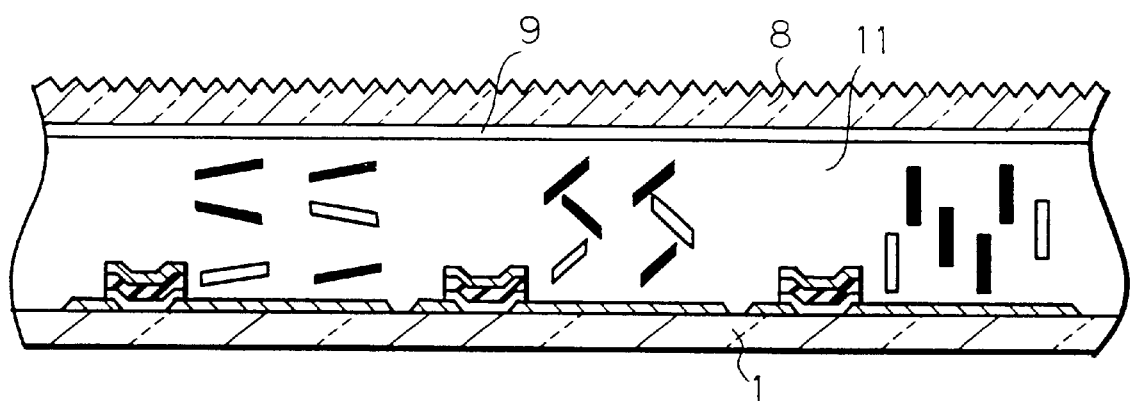

Finally, referring to FIG. 4G, a counter glass substrate 8 having an uneven surface is prepared. For example, the surface of the glass substrate 8 is made uneven by using a sand blast method. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing, and the device is sealed by an ultraviolet-setting resin.

Even in the third embodiment as illustrated in FIGS. 4A through 4G, although a step for forming the Mo layer 12 as an ohmic contact material for the $N^+$-type amorphous silicon layer 4 is added to the first embodiment, only two photolithography and etching processes are carried out. In addition, the aluminum alloy layer 2 and the Mo layer 12 are sequentially formed in the same sputtering apparatus. Therefore, the manufacturing cost can be reduced.

Also, in the third embodiment, the Mo layer 12 has good ohmic contact characteristics to the aluminum alloy layer 2 and the $N^+$-type amorphous silicon layer 4. Therefore, the aluminum alloy layer 2 can be electrically connected effectively via the Mo layer 12 to the $N^+$-type amorphous silicon layer 4.

Note that, since the Mo layer 12 on the aluminum alloy layer 2 outside of the island is etched, the aluminum alloy layer 2 completely serves as reflecting means.

Also, in FIGS. 4A through 4G, in the same way as in FIGS. 2A through 2G, the diffusion of aluminum atoms and silicon atoms can be suppressed, thus avoiding the deterioration of the characteristics of the TFT. In addition, the high temperature resistance and anti-electromigration characteristics of the aluminum alloy layers 2 and 7 can be improved. Further, polarization plates are unnecessary and a bright display can be obtained.

A fourth embodiment of the method for manufacturing a reflective LCD apparatus according to the present invention will be explained next with reference to FIGS. 5A through 5G. In FIGS. 5A through 5G, an indium tin oxide (ITO) layer is used instead of the Mo layer 12 of FIGS. 3A through 3G.

Figure 5A:
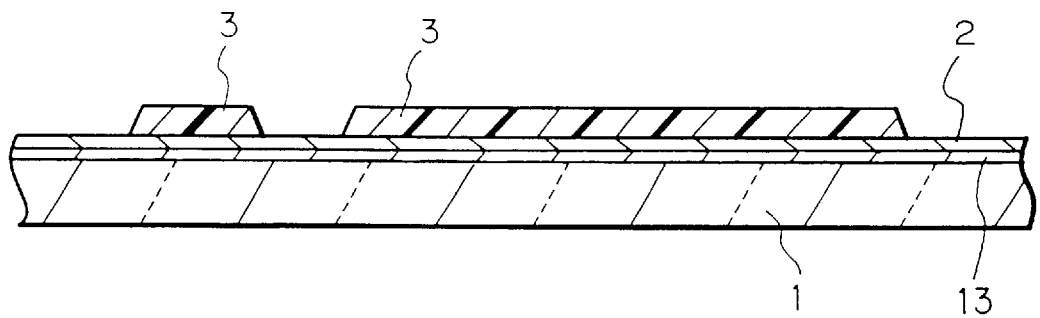
FIGS. 5A through 5G are cross-sectional views illustrating a fourth embodiment of the reflective LCD apparatus according to the present invention.

First, referring to FIG. 5A, an about 20 nm thick ITO layer 13 is deposited by a sputtering process on a glass substrate 1. Then, an about 80 nm thick Al—Nd—Si alloy layer 2 is deposited by a sputtering process on the ITO layer 13. Then, a photoresist pattern 3 corresponding to a drain electrode and a source (pixel) electrode is formed by a photolithography process.

Figure 5B:
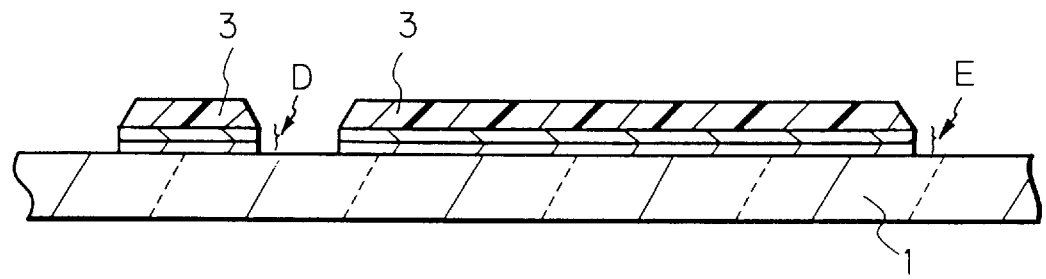

Next, referring to FIG. 5B, the aluminum alloy layer 2 and the ITO layer 13 are etched by a dry etching process using $Cl_2$ gas, $CF_4$ gas and $H_2$ gas with a mask of the photoresist pattern 3. As a result, a drain electrode D and a pixel electrode E are formed by the aluminum alloy layer 2 and the ITO layer 13. In this case, the side edges of the drain electrode D and the pixel electrode E are not tapered.

Figure 5C:
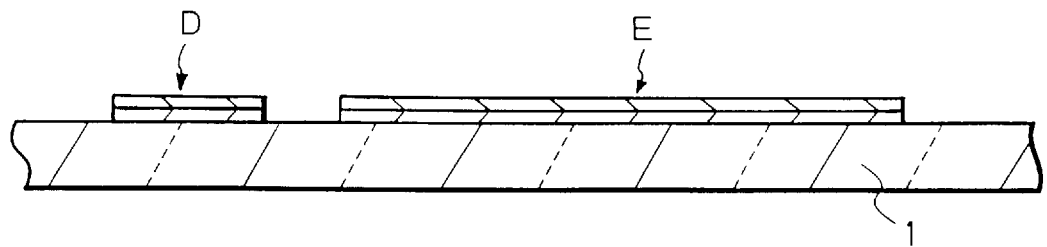

Next, referring to FIG. 5C, the photoresist pattern 3 is removed.

Figure 5D:
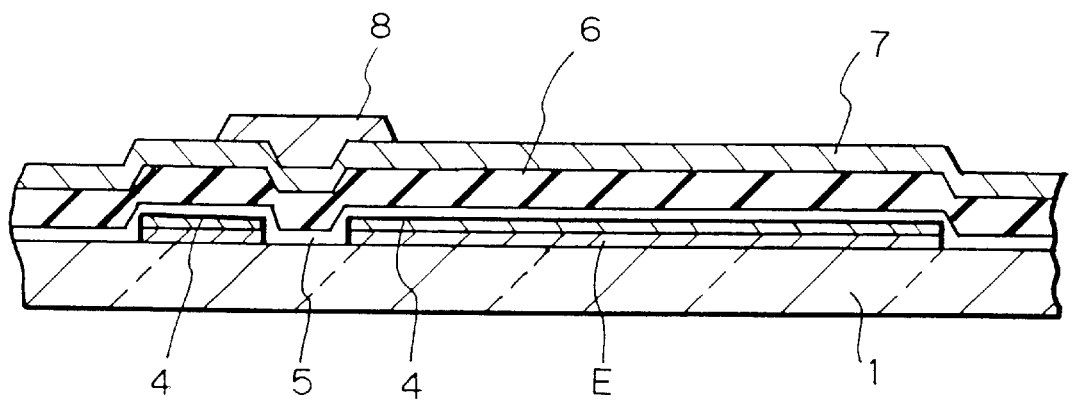

Next, referring to FIG. 5D, a phosphor rich amorphous silicon layer, i.e., an about 5 nm thick $N^+$-type amorphous silicon layer 4 is deposited by a PCVD process using $PH_3$ gas added by a very small amount of $SiH_4$ gas only the drain electrode D and the pixel electrode E. Note that the $N^+$-type amorphous silicon layer 4 can be formed by a $PH_3$ plasma-doping process.

Subsequently, an about 50 nm thick I-type (non-doped) amorphous silicon layer 5 is deposited by a PCVD process using $SiH_4$ gas and $H_2$ gas on the entire surface. In addition, an about 300 nm thick silicon nitride layer 6 serving as a gate insulating layer is deposited by a PCVD process using $SiH_4$ gas, $NH_3$ gas and $N_2$ gas. Note that all the above-mentioned PCVD processes are carried out in the same PCVD apparatus.

Then, an about 100 nm thick Al—Nd—Si alloy layer 7 is deposited by a sputtering process on the silicon nitride layer 6. Then, a photoresist pattern 3A corresponding to a gate electrode is formed on the aluminum alloy layer 7.

Figure 5E:
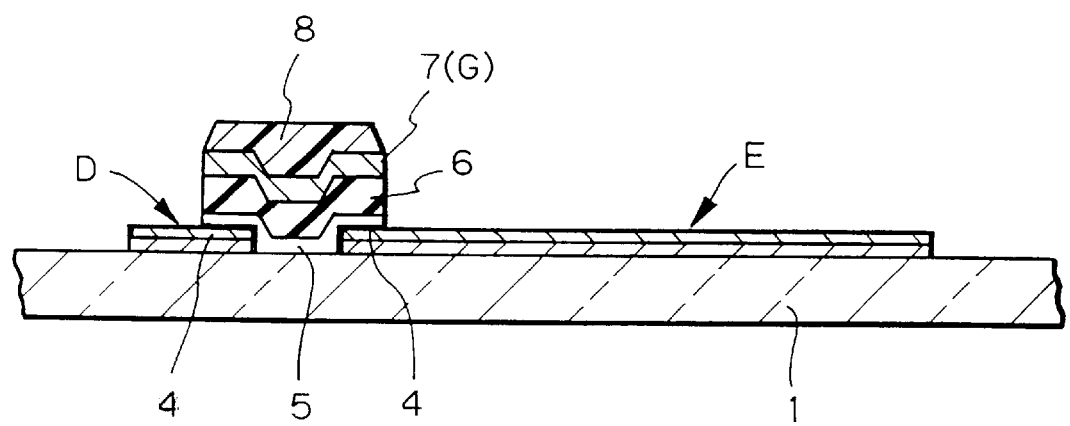

Next, referring to FIG. 5E, the aluminum alloy layer 7 is etched by a wet etching process using a phosphoric acid/ nitric acid solution with a mask of the photoresist pattern 3A to form a gate electrode 7(G). Note that the aluminum alloy layer 7 can be etched by a dry etching process using $Cl_2$ gas. Then, the silicon nitride layer 6, the I-type amorphous silicon layer 5, and the $N^+$-type amorphous silicon layer 4 are sequentially etched by a dry etching process using $CF_4$ gas and $O_2$ gas with a mask of the photoresist pattern 3A. Thus, an island is formed. Also, since the aluminum alloy layer 2 is not etched by the above-mentioned dry etching process using fluorine gas, the drain electrode D and the pixel electrode E outside of the island are exposed.

Figure 5F:
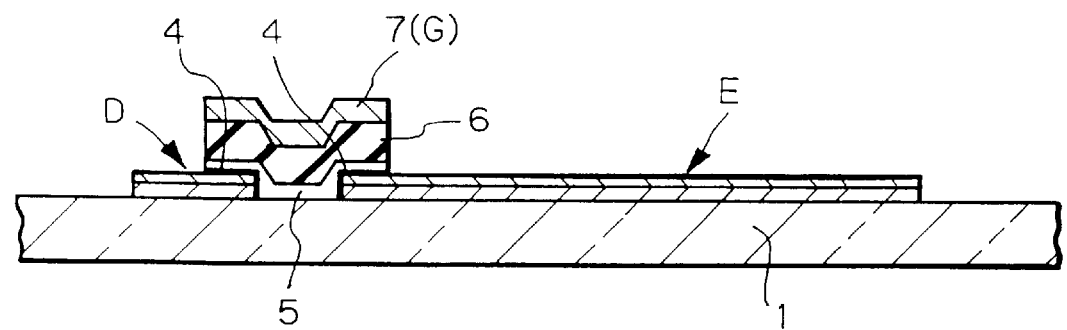

Next, referring to FIG. 5F, the photoresist pattern 3A is removed. Thus, the island for a staggered TFT where the gate electrode 7(G) is below the amorphous silicon layer 5 is formed.

Figure 5G:
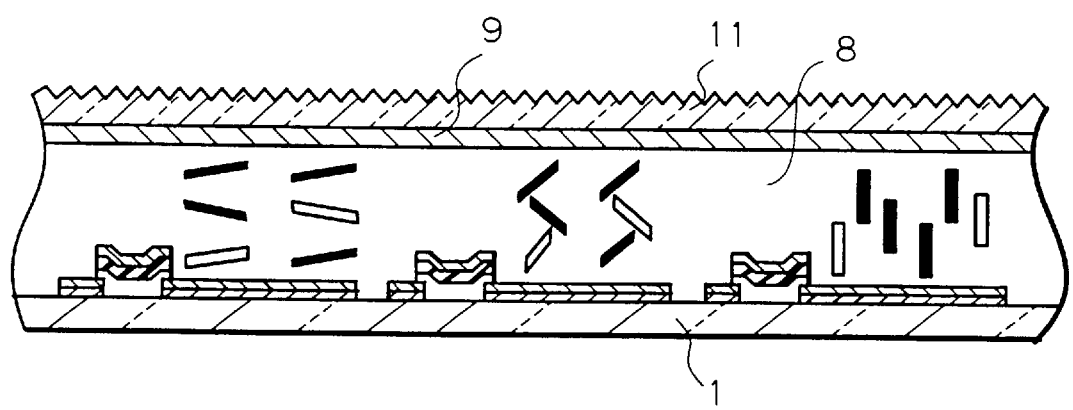

Finally, referring to FIG. 5G, a counter glass substrate 8 having an uneven surface is prepared. For example, the surface of the glass substrate 8 is made uneven by using a sand blast method. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing, and the device is sealed by an ultraviolet-setting resin.

In the fourth embodiment as illustrated in FIGS. 5A through 5G, although a step for forming the ITO layer 13 as an ohmic contact material for the $N^+$-type amorphous silicon layer 4 is added to the first embodiment, only two photolithography and etching processes are carried out. In addition, the ITO layer 13 and the aluminum alloy layer 2 are sequentially formed in the same sputtering apparatus. Therefore, the manufacturing cost can be reduced.

Also, in the fourth embodiment, the ITO layer 13 has good ohmic contact characteristics to the $N^+$-type amorphous silicon layer 4. Therefore, the aluminum alloy layer 2 can be electrically connected effectively via the ITO layer 13 to the $N^+$-type amorphous silicon layer 4.

Also, in FIGS. 5A through 5G, in the same way as in FIGS. 2A through 2G, the diffusion of aluminum atoms and silicon atoms can be suppressed, thus avoiding the deterioration of the characteristics of the TFT. In addition, the high temperature resistance and anti-electromigration characteristics of the aluminum alloy layers 2 and 7 can be improved. Further, polarization plates are unnecessary and a bright display can be obtained.

A fifth embodiment of the method for manufacturing a reflective LCD apparatus according to the present invention will be explained next with reference to FIGS. 6A through 6G. In FIGS. 6A through 6G, an ITO layer is used instead of the Mo layer 12 of FIGS. 4A through 4G.

Figure 6A:
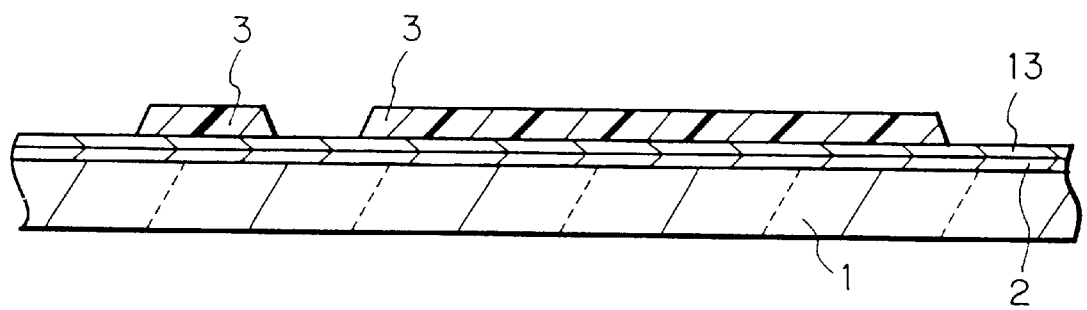
FIGS. 6A through 6G are cross-sectional views illustrating a fifth embodiment of the reflective LCD apparatus according to the present invention.

First, referring to FIG. 6A, an about 80 nm thick AK—Nd—Si alloy layer 2 is deposited by a sputtering process on a glass substrate 1. Then, an about 20 nm thick ITO layer 13 is deposited by a sputtering process on the aluminum alloy layer 2. Then, a photoresist pattern 3 corresponding to a drain electrode and a source (pixel) electrode is formed by a photolithography process.

Figure 6B:
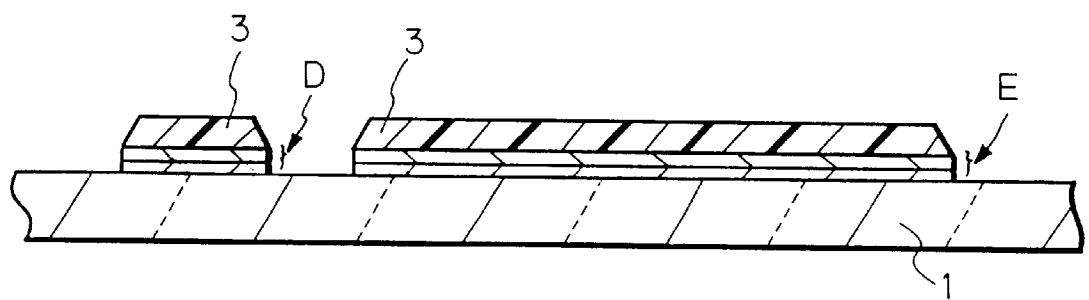

Next, referring to FIG. 6B, the ITO layer 13 and the aluminum alloy layer 2 are etched by a dry etching process using $Cl_2$ gas, $CF_4$ gas and $H_2$ gas with a mask of the photoresist pattern 3. As a result, a drain electrode D and a pixel electrode E are formed by the ITO layer 13 and the aluminum alloy layer 2. In this case, the side edges of the drain electrode D and the pixel electrode E are not tapered.

Figure 6C:
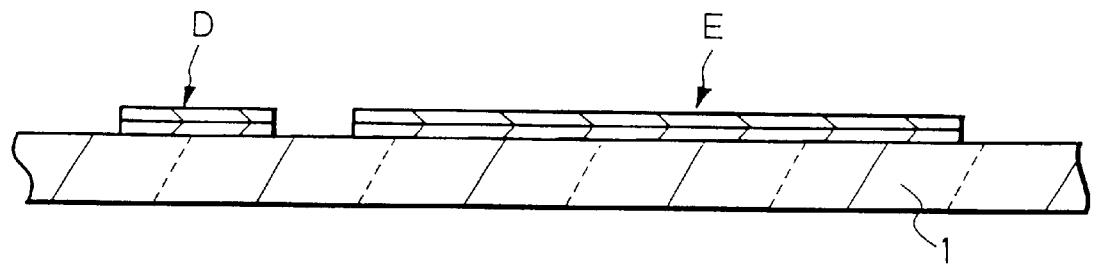

Next, referring to FIG. 6C, the photoresist pattern 3 is removed.

Figure 6D:
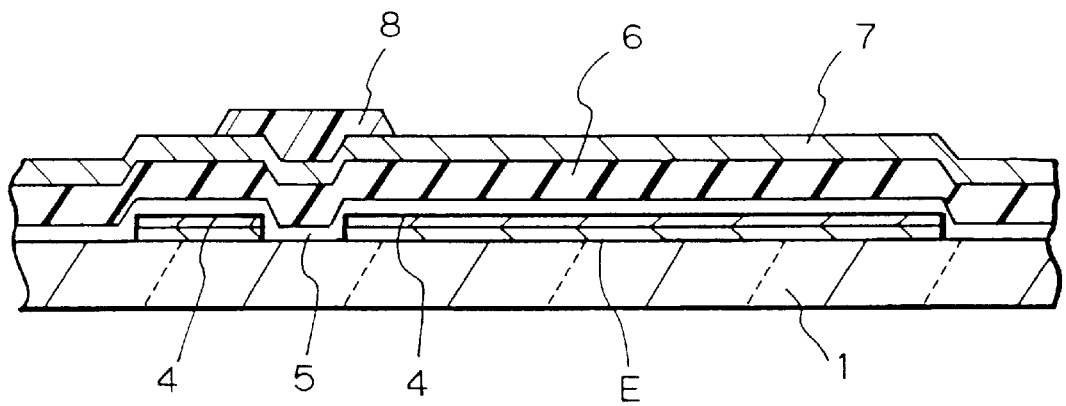

Next, referring to FIG. 6D, a phosphor rich amorphous silicon layer, i.e., an about 5 nm thick $N^+$-type amorphous silicon layer 4 is deposited by a PCVD process using $PH_3$ gas added by a very small amount of $SiH_4$ gas only the drain electrode D and the pixel electrode E. Note that the $N^+$-type amorphous silicon layer 4 can be formed by a $PH_3$ plasma-doping process.

Subsequently, an about 50 nm thick I-type (non-doped) amorphous silicon layer 5 is deposited by a PCVD process using $SiH_4$ gas and $H_2$ gas on the entire surface. In addition, an about 300 nm thick silicon nitride layer 6 serving as a gate insulating layer is deposited by a PCVD process using $SiH_4$ gas, $NH_3$ gas and $N_2$ gas. Note that all the above-mentioned PCVD processes are carried out in the same PCVD apparatus.

Then, an about 100 nm thick Al—Nd—Si alloy layer 7 is deposited by a sputtering process on the silicon nitride layer 6. Then, a photoresist pattern 3A corresponding to a gate electrode is formed on the aluminum alloy layer 7.

Figure 6E:
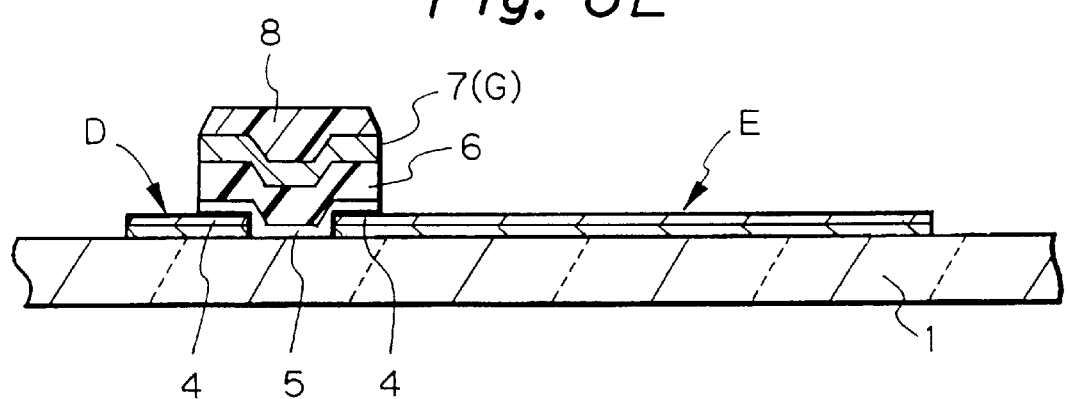

Next, referring to FIG. 6E, the aluminum alloy layer 7 is etched by a wet etching process using a phosphoric acid/nitric acid solution with a mask of the photoresist pattern 8 to form a gate electrode 7(G). Note that the aluminum alloy layer 7 can be etched by a dry etching process using $Cl_2$ gas. Then, the silicon nitride layer 6, the I-type amorphous silicon layer 5, and the $N^+$-type amorphous silicon layer 4 are sequentially etched by a dry etching process using $CF_4$ gas and $O_2$ gas with a mask of the photoresist pattern 3A. Thus, an island is formed. Also, since the ITO layer 13 is not etched by the above-mentioned dry etching process using fluorine gas, the drain electrode D and the pixel electrode E outside of the island are exposed. Note that, since the ITO layer 13 is transparent, even if the ITO layer 13 remains in the drain electrode D and the pixel electrode E, the aluminum alloy layer 2 can completely serve as reflecting means.

Figure 6F:
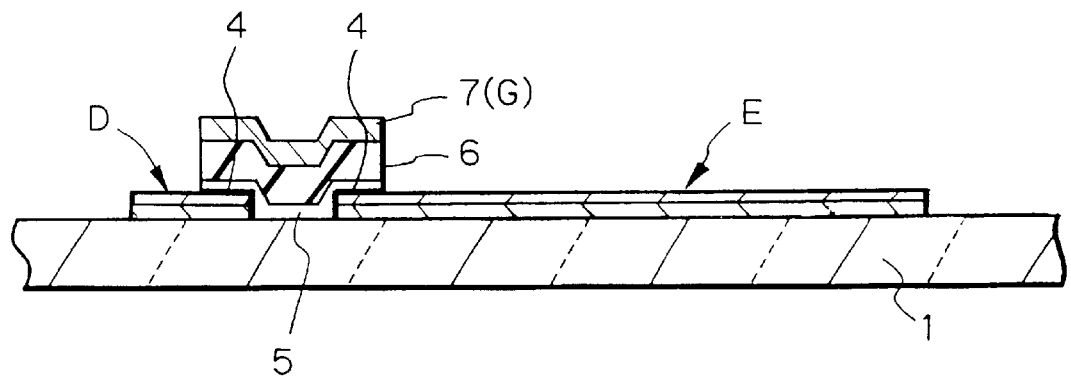

Next, referring to FIG. 6F, the photoresist pattern 3A is removed. Thus, the island for a staggered TFT where the gate electrode 7(G) is below the amorphous silicon layer 5 is formed.

Figure 6G:
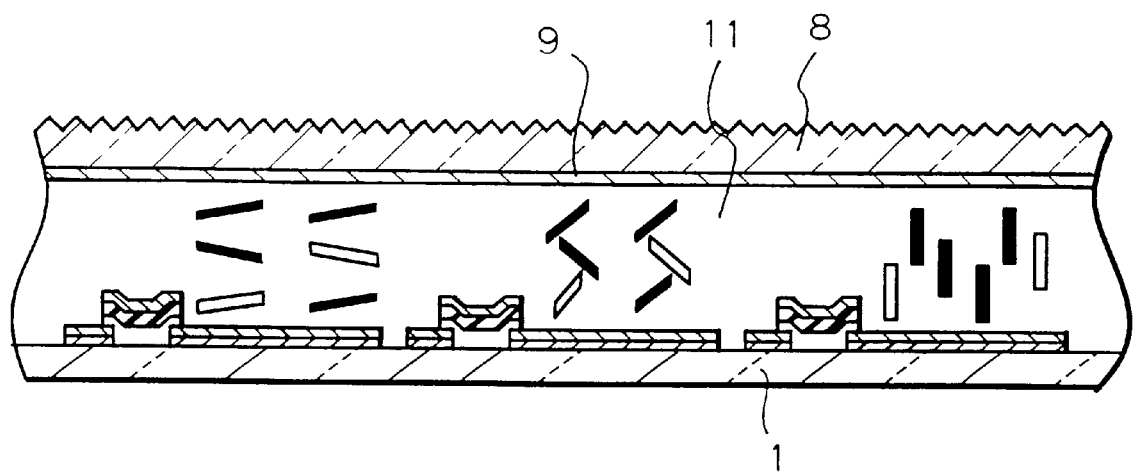
Figure 7A:
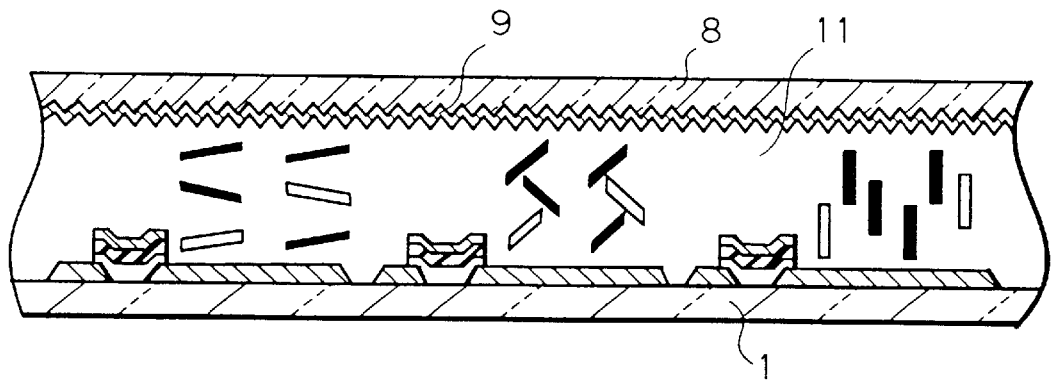
FIGS. 7A, 7B, 7C, 7D and 7E are cross-sectional views illustrating modifications of the apparatuses of FIGS. 2G, 3G, 4G, 5G and 6G, respectively.
Figure 7B:
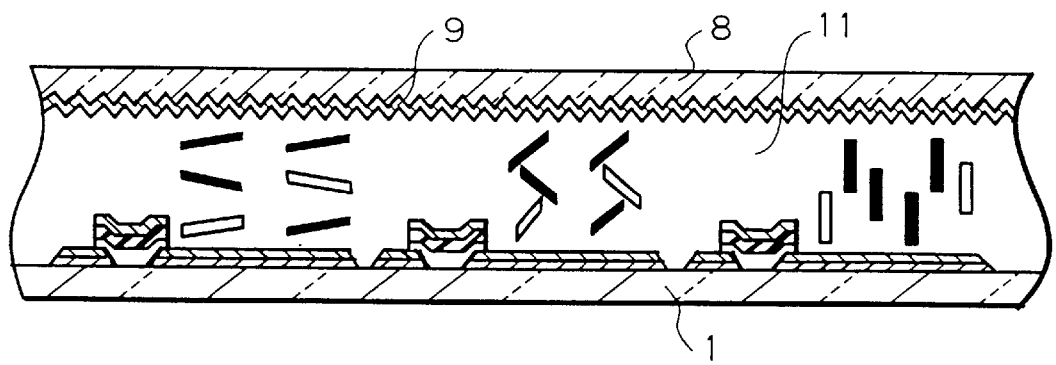
Figure 7C:
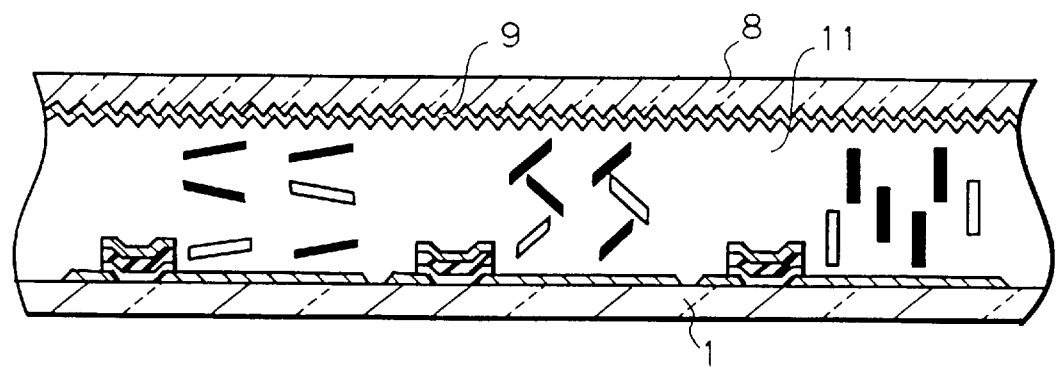
Figure 7D:
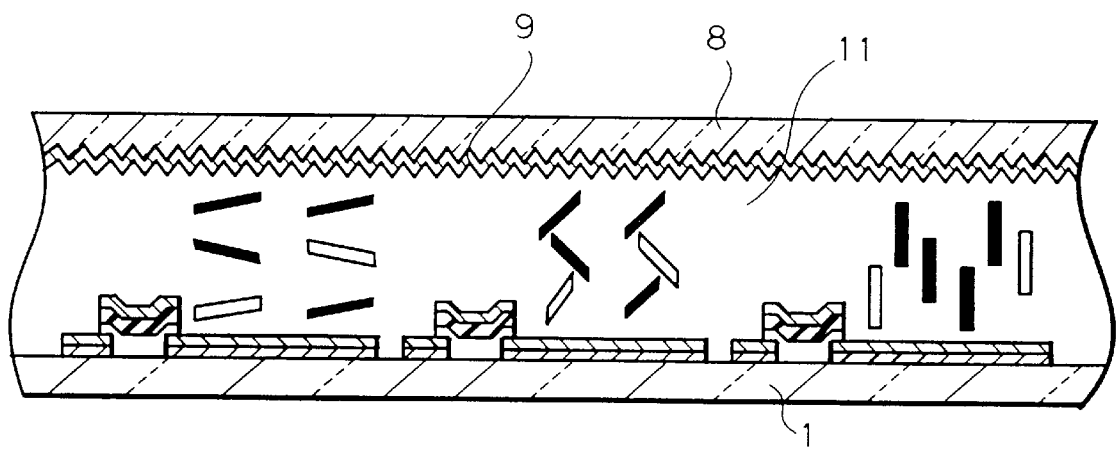
Figure 7E:
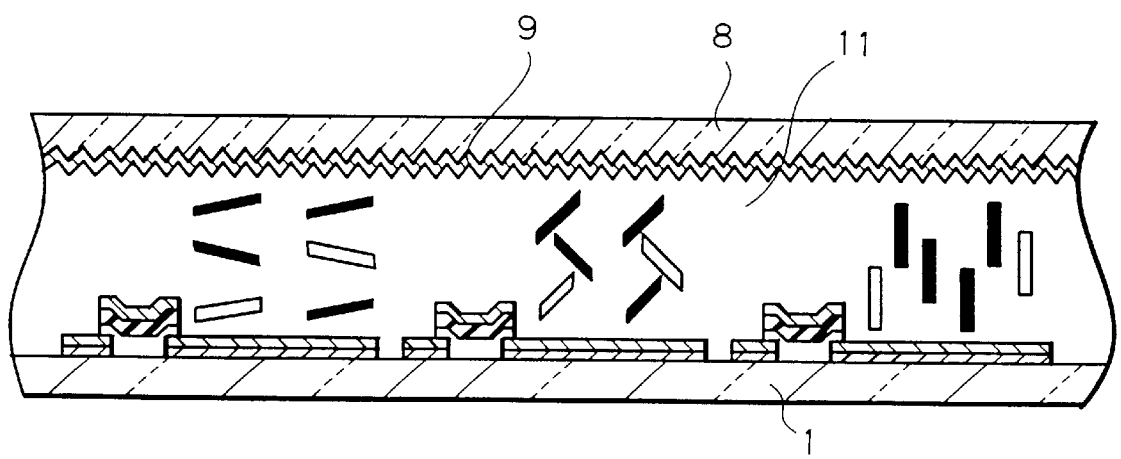
Figure 8A:
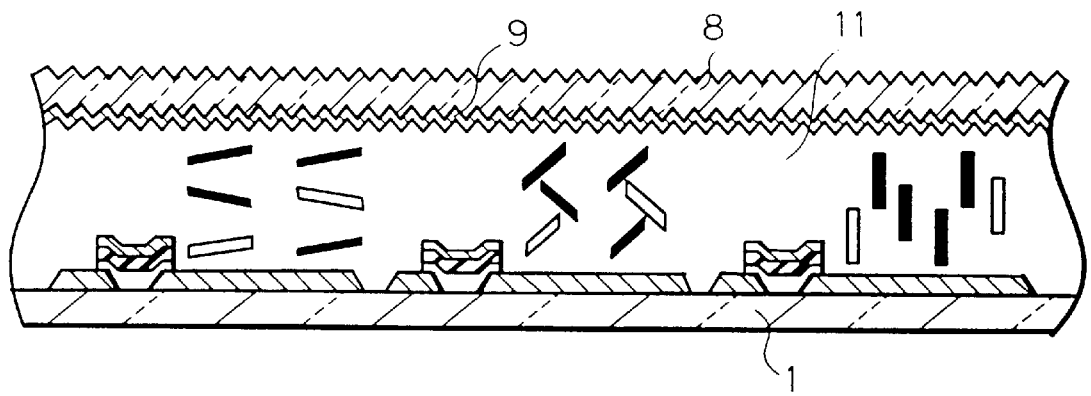
FIGS. 8A, 8B, 8C, 8D and 8E are cross-sectional views illustrating modifications of the apparatuses of FIGS. 2G, 3G, 4G, 5G and 6G, respectively.
Figure 8B:
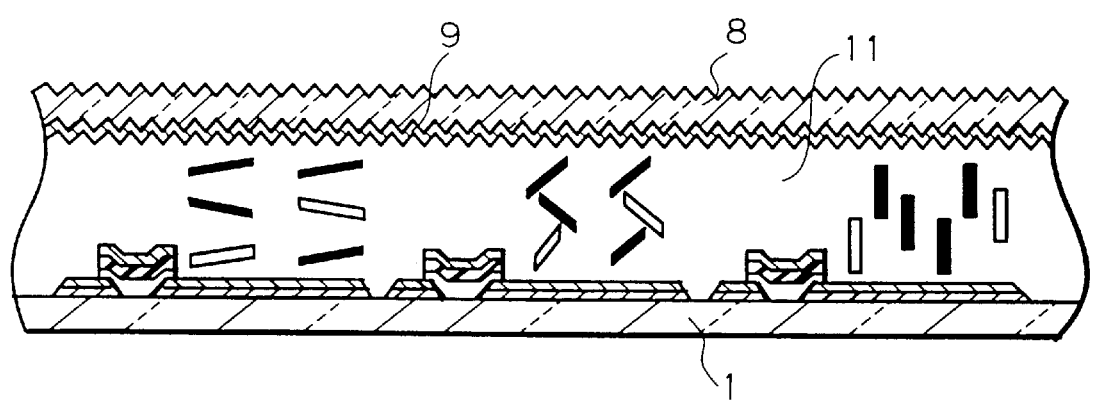
Figure 8C:
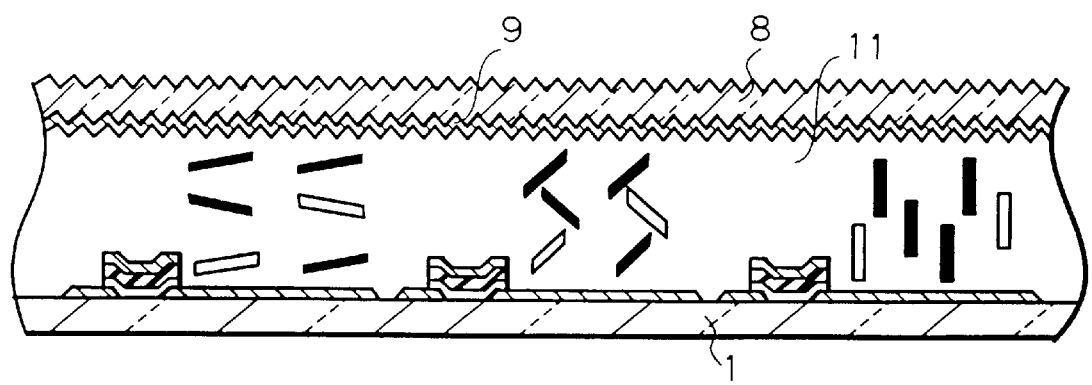
Figure 8D:
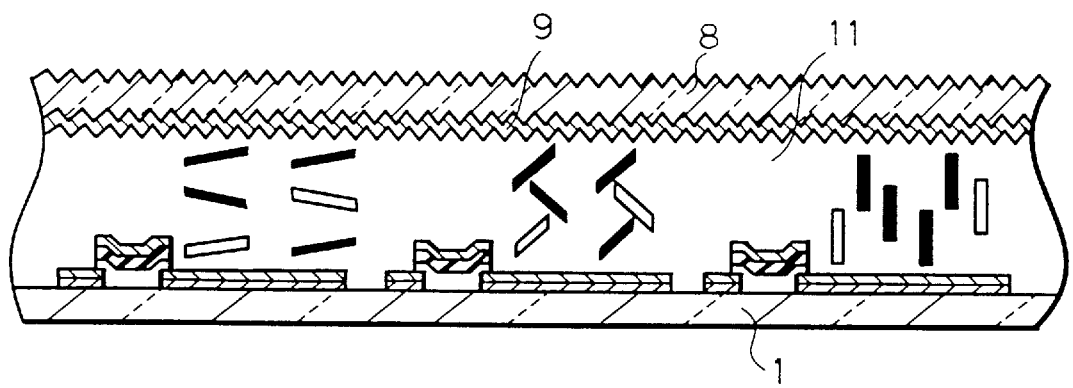
Figure 8E:
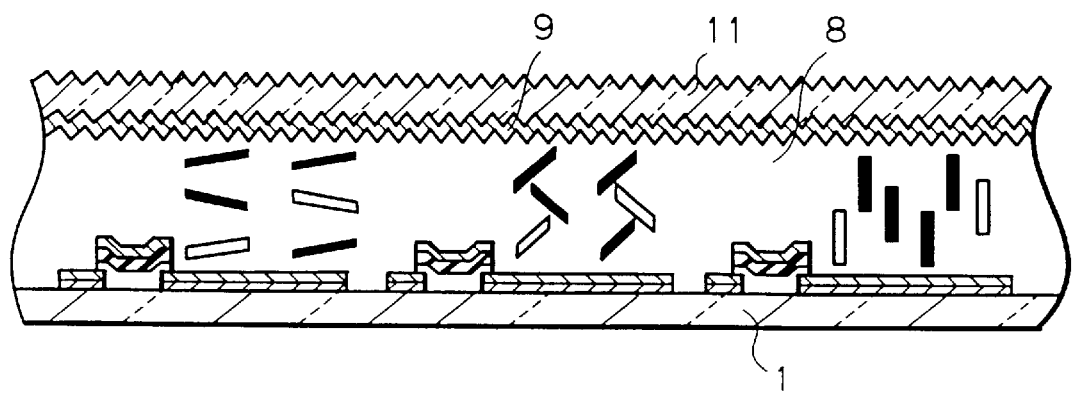
Figure 9A:
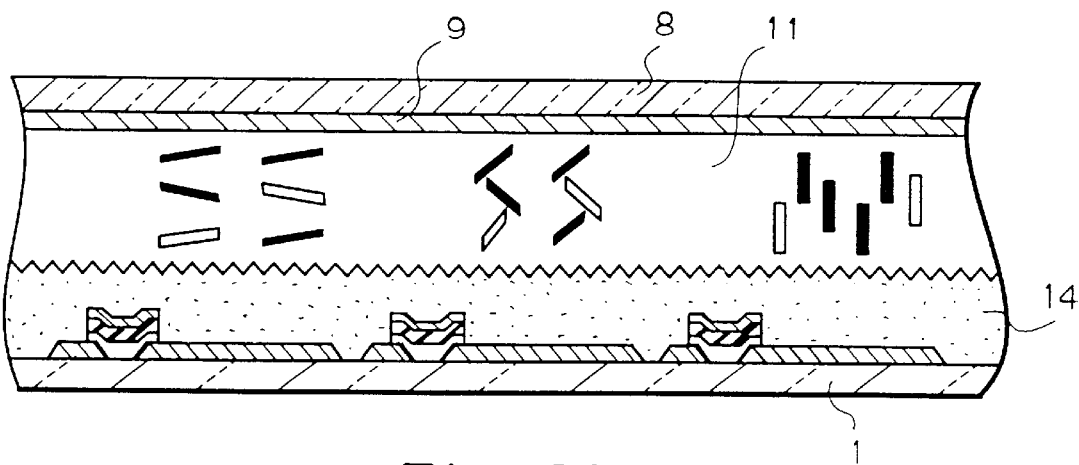
FIGS. 9A, 9B, 9C, 9D and 9E are cross-sectional views illustrating modifications of the apparatuses of FIGS. 2G, 3G, 4G, 5G and 6G, respectively.
Figure 9B:
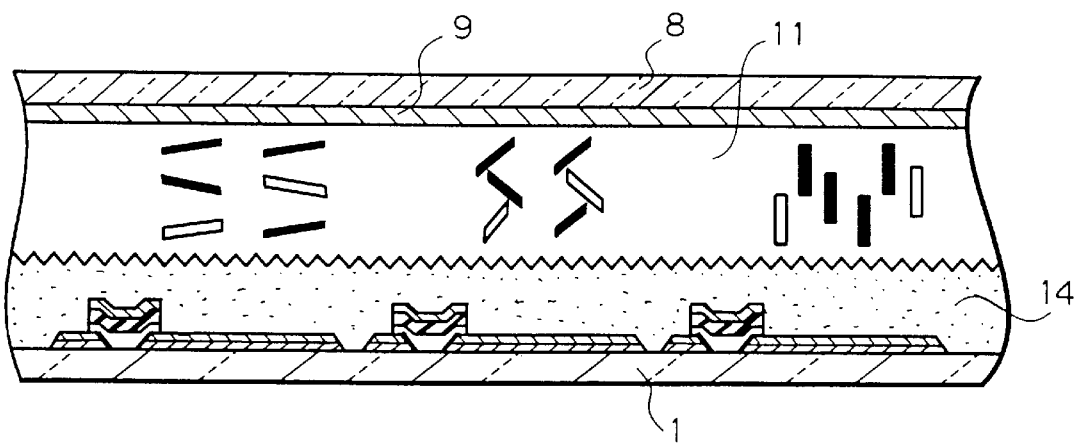
Figure 9C:
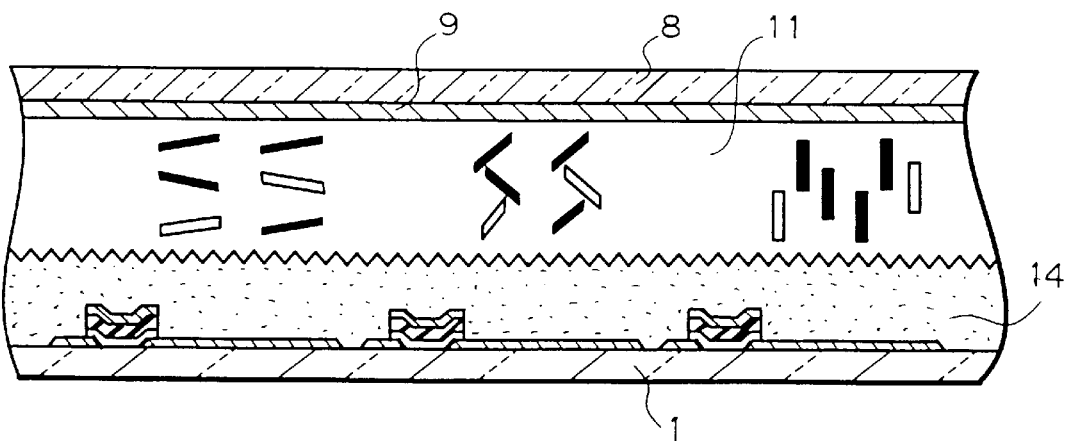
Figure 9D:
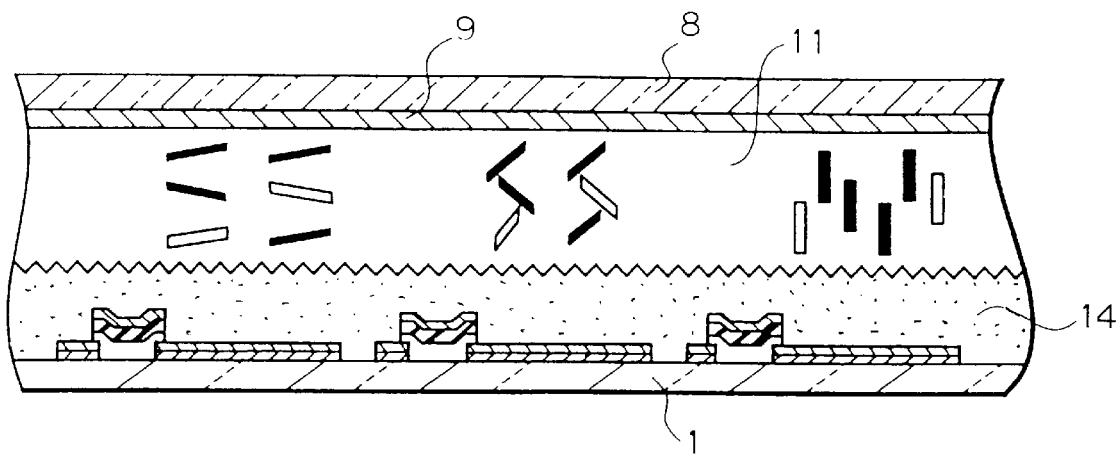
Figure 9E:
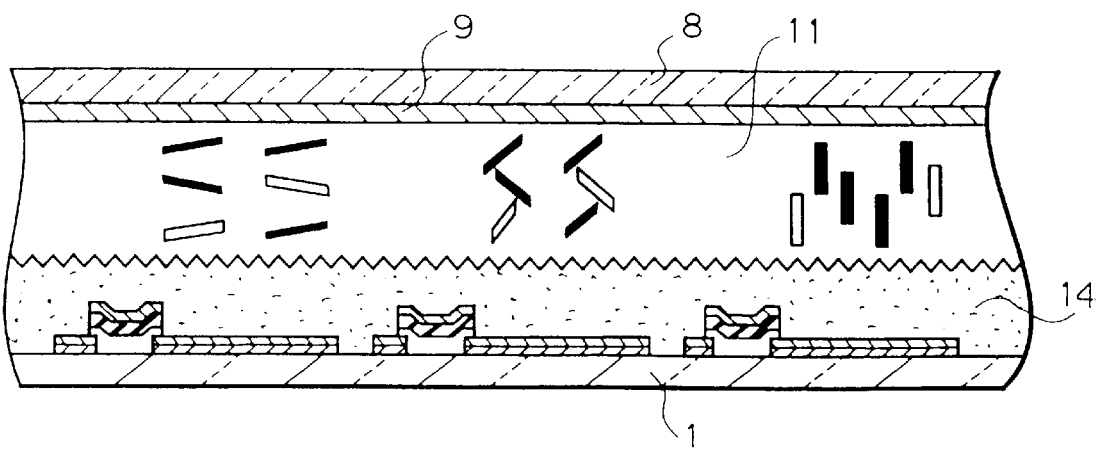
Figure 10A:
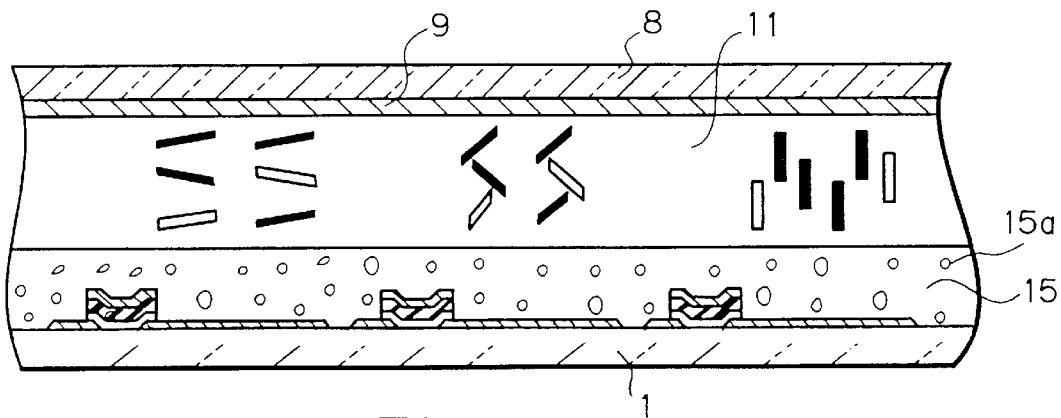
FIGS. 10A, 10B, 10C, 10D and 10E are cross-sectional views illustrating modifications of the apparatuses of FIGS. 2G, 3G, 4G, 5G and 6G, respectively.
Figure 10B:
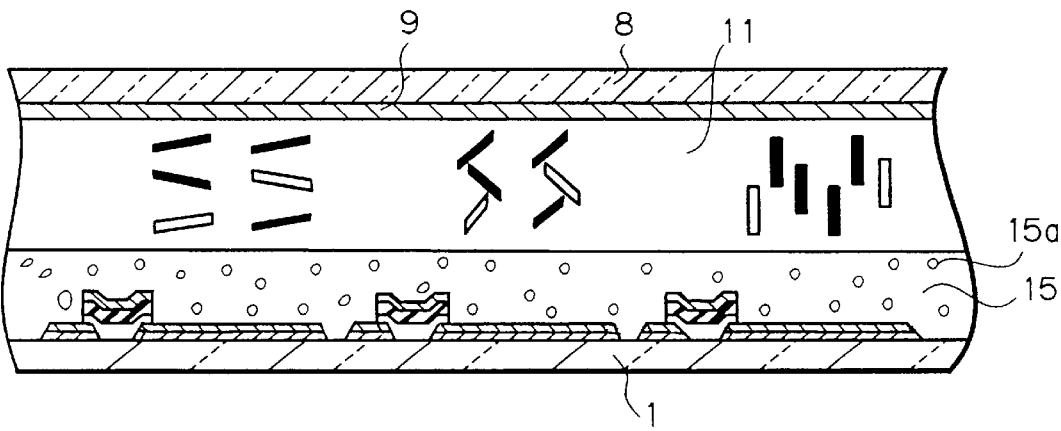
Figure 10C:
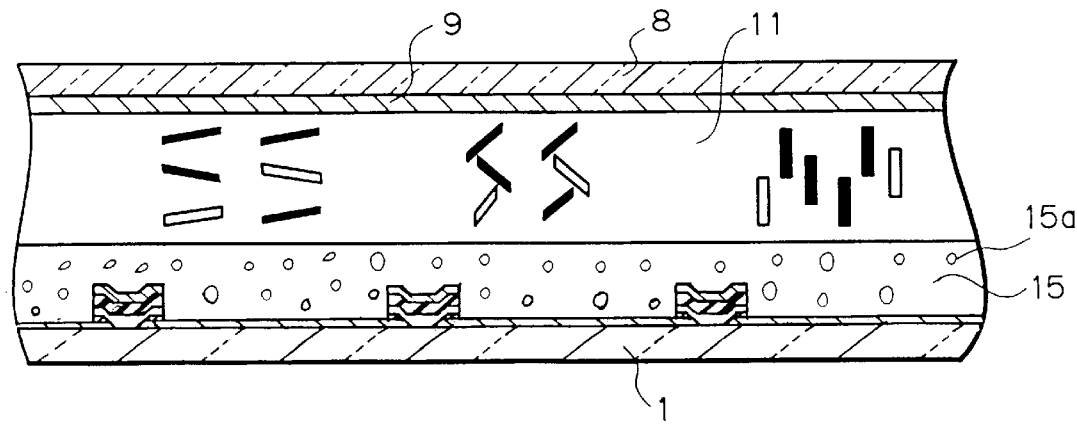
Figure 10D:
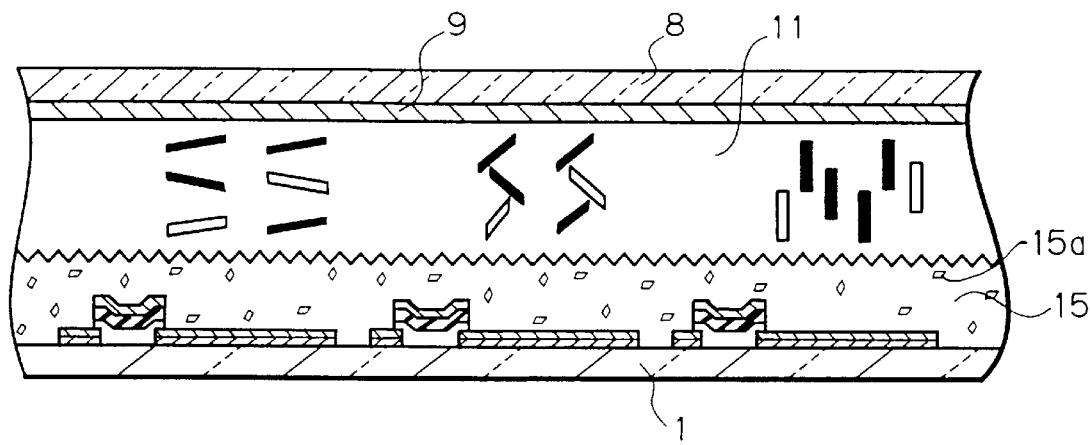
Figure 10E:
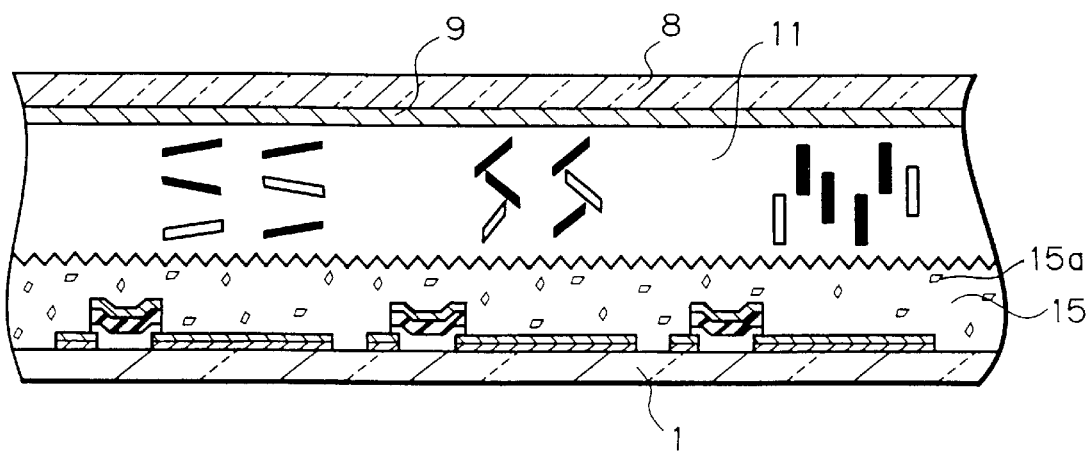

Finally, referring to FIG. 6G, a counter glass substrate 8 having an uneven surface is prepared. For example, the surface of the glass substrate 8 is made uneven by using a sand blast method. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing, and the device is sealed by an ultraviolet-setting resin.

In the fifth embodiment as illustrated in FIGS. 6A through 6G, although a step for forming the ITO layer 13 as an ohmic contact material for the $N^+$-type amorphous silicon layer 4 is added to the first embodiment, only two photolithography and etching processes are carried out. In addition, the ITO layer 13 and the aluminum alloy layer 2 are sequentially formed in the same sputtering apparatus. Therefore, the manufacturing cost can be reduced.

Also, in the fifth embodiment, the ITO layer 13 has a good ohmic contact characteristics to the N+-type amorphous silicon layer 4. Therefore, the aluminum alloy layer 2 can be electrically connected effectively via the ITO layer 13 to the N+-type amorphous silicon layer 4.

Also, in FIGS. 6A through 6G, in the same way as in FIGS. 2A through 2G, the diffusion of aluminum atoms and silicon atoms can be suppressed, thus avoiding the deterioration of the characteristics of the TFT. In addition, the high temperature resistance and anti-electromigration characteristics of the aluminum alloy layers 2 and 7 can be improved. Further, polarization plates are unnecessary and a bright display can be obtained.

In FIGS. 7A through 7E, which are modifications of the apparatuses of FIGS. 2G, 3G, 4G, 5G and 6G, respectively, an opposite surface of the counter glass substrate 8 on which the transparent common electrode 9 is formed is made uneven. Even in this case, the same light scattering effect can be expected.

In FIGS. 8A through 8E, which are also modifications of the apparatuses of FIGS. 2G, 3G, 4G, 5G and 6G, respectively, both surfaces of the counter glass substrate 8 are made uneven. Even in this case, the same light scattering effect can be expected.

In FIGS. 9A through 9E, which are further modifications of the apparatuses of FIGS. 2G, 3G, 4G, 5G and 6G, respectively, a transparent insulating layer 14 made of photosensitive acrylic resin or polyimide resin having an uneven surface is formed on the TFTs instead of providing an uneven surface on the counter glass substrate 8. Note that a large difference in refractive index between the transparent insulating layer 14 and the liquid crystal layer 11 enhances the light scattering effect. Even in this case, the same light scattering effect can be expected.

In FIGS. 10A through 10E, which are still further modifications of the apparatuses of FIGS. 2G, 3G, 4G, 5G and 6G, respectively, a transparent insulating layer 15 is formed on the TFTs instead of providing an uneven surface on the counter glass substrate 8. In this case, the transparent insulating layer 15 is formed by spin-coating polyimide resin including light scattering particles (beeds) 15a. Even in this case, the same light scattering effect can be expected.

A sixth embodiment of the method for manufacturing a reflective LCD apparatus according to the present invention will be explained next with reference to FIGS. 11A through 11G. Note that the sixth embodiment is a modification of the first embodiment as illustrated in FIGS. 2A through 2G.

Figure 11A:
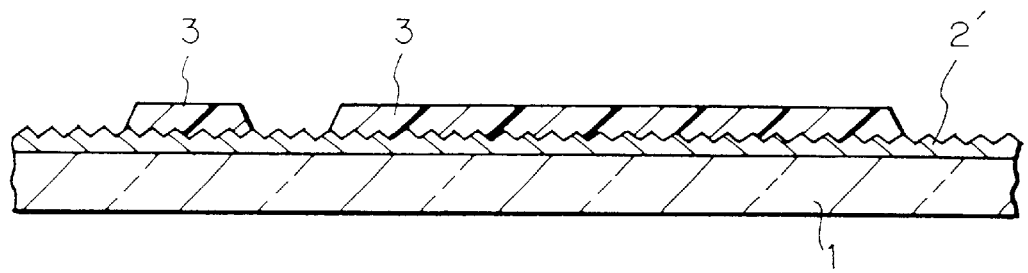
FIGS. 11A through 11G are cross-sectional views illustrating a sixth embodiment of the reflective LCD apparatus according to the present invention.
Figure 11B:
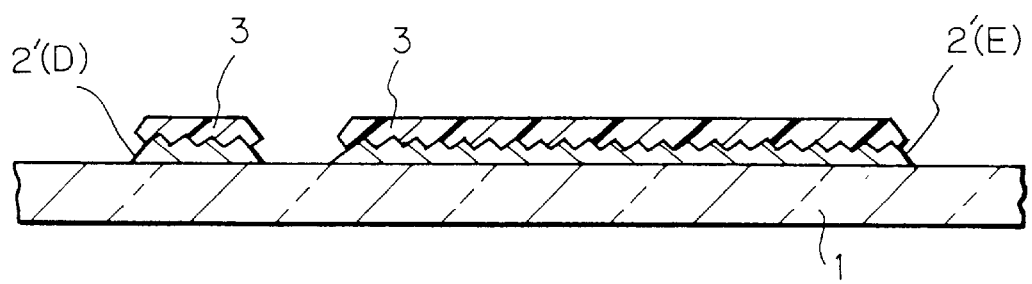
Figure 11C:
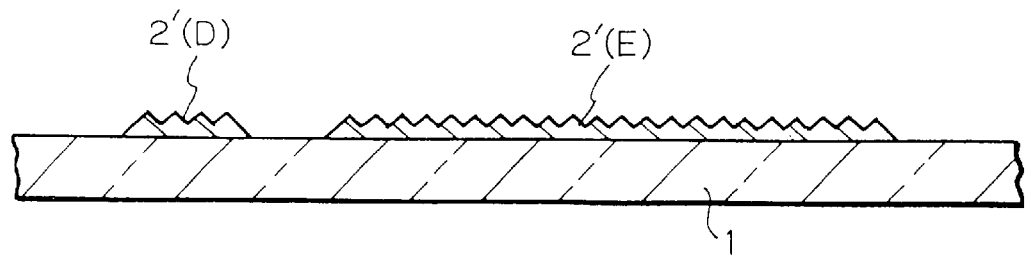
Figure 11D:
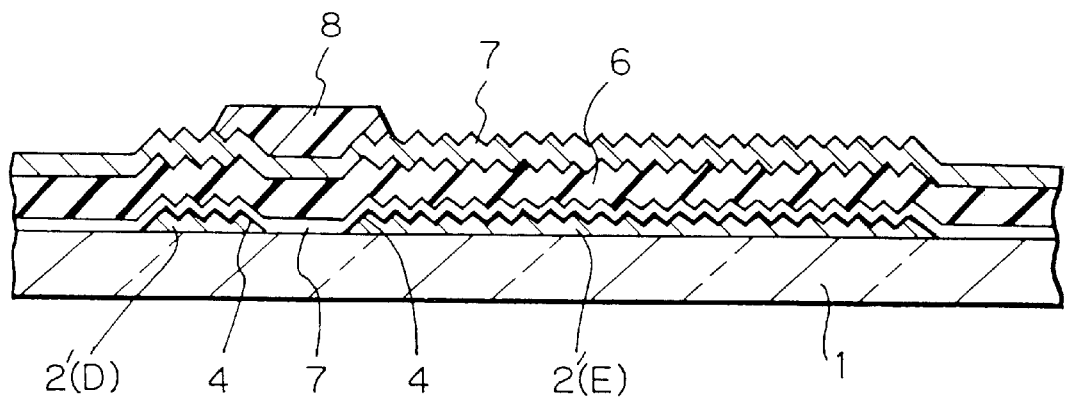
Figure 11E:
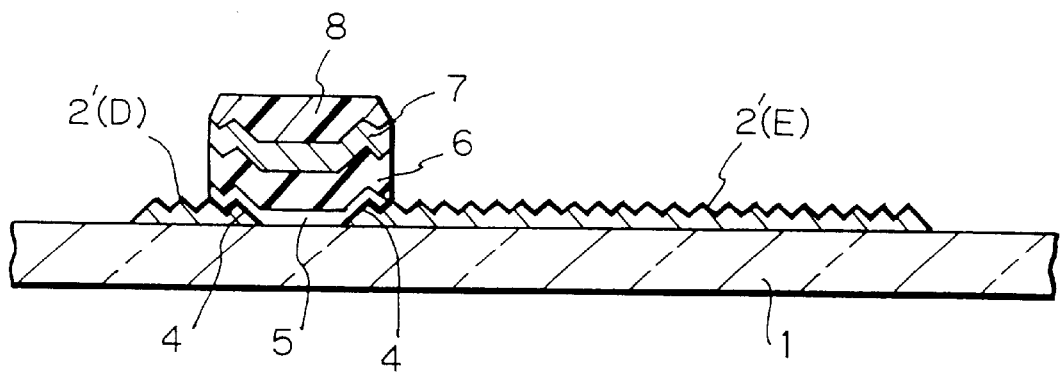
Figure 11F:
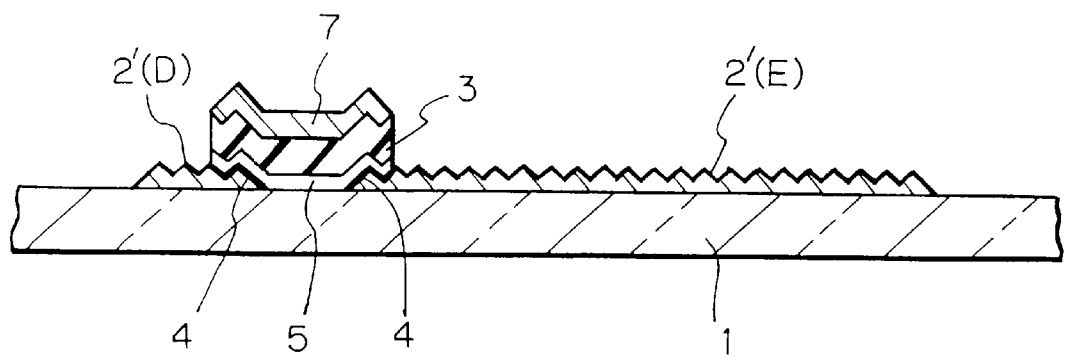

First, referring to FIG. 11A, an about 200 nm thick Al—Si alloy layer 2' is deposited by a sputtering process at a substrate temperature higher than 150° C. on a glass substrate 1. As a result, the surface of the aluminum alloy layer 2' is made uneven and turbid as aluminum crystal grains grow. In this case, the higher the substrate temperature, the larger the aluminum grain size. Also, the thicker the aluminum alloy layer 2', the larger the aluminum crystal grain size. However, if the aluminum alloy layer 2' is too thick, the coverage characteristics of PCVD layers which will be formed thereon become deteriorated. Thus, the aluminum alloy layer 2' can serve as light scattering means as well as light reflecting means. Then, a photoresist pattern 3 corresponding to a drain electrode and a source (pixel) electrode is formed by a photolithography process.

Next, referring to FIGS. 11B through 11F, the same operations as in the steps as illustrated in FIGS. 2B through 2F are carried out.

Figure 11G:
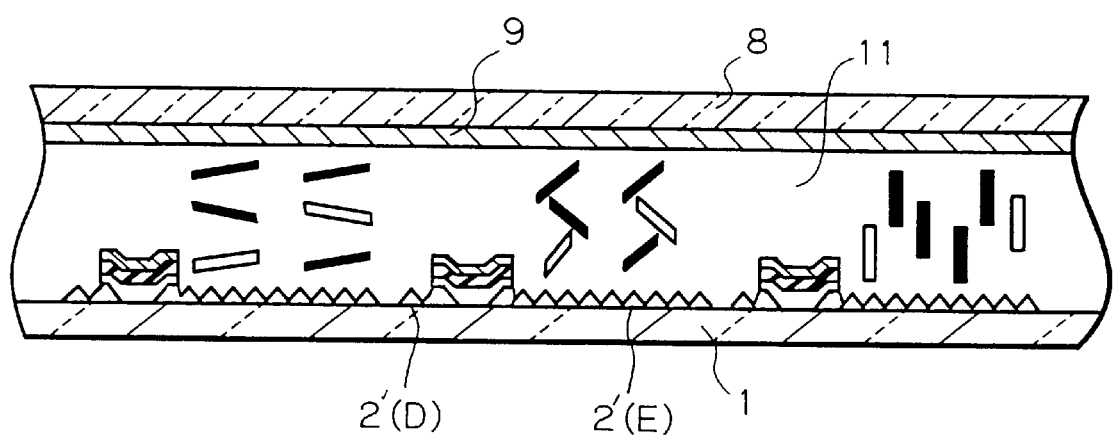

Finally, referring to FIG. 11G, a counter glass substrate 8 is prepared. In this case, the surfaces of the counter glass substrate 8 are both flat. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing, and the device is sealed by an ultraviolet-setting resin.

In the sixth embodiment the formation of a light scattering means on the counter glass substrate 8 is unnecessary, which reduces the manufacturing cost.

A seventh embodiment of the method for manufacturing a reflective LCD apparatus according to the present invention will be explained next with reference to FIGS. 12A through 12G. Note that the seventh embodiment is another modification of the first embodiment as illustrated in FIGS. 2A through 2G.

Referring to FIGS. 12A through 12E, the same operations as in the steps illustrated in FIGS. 2A through 2E are carried out.

Figure 12A:
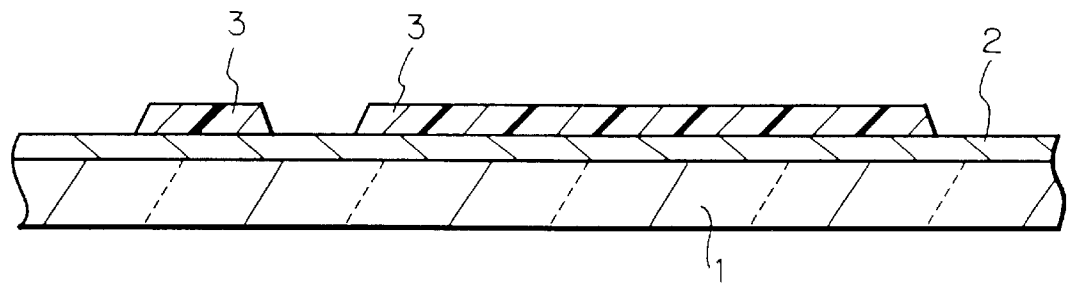
FIGS. 12A through 12G are cross-sectional views illustrating a seventh embodiment of the reflective LCD apparatus according to the present invention.
Figure 12B:
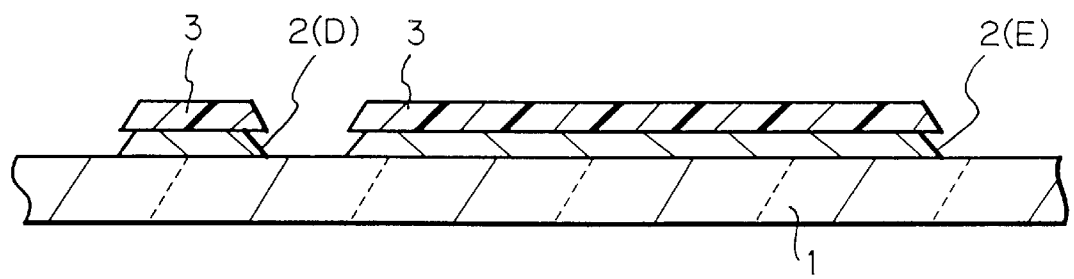
Figure 12C:
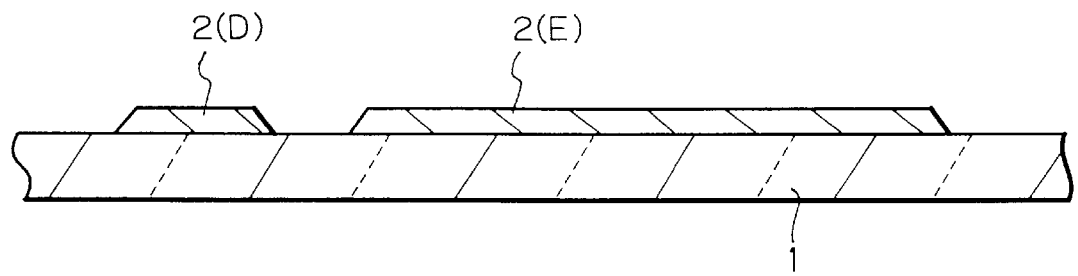
Figure 12D:
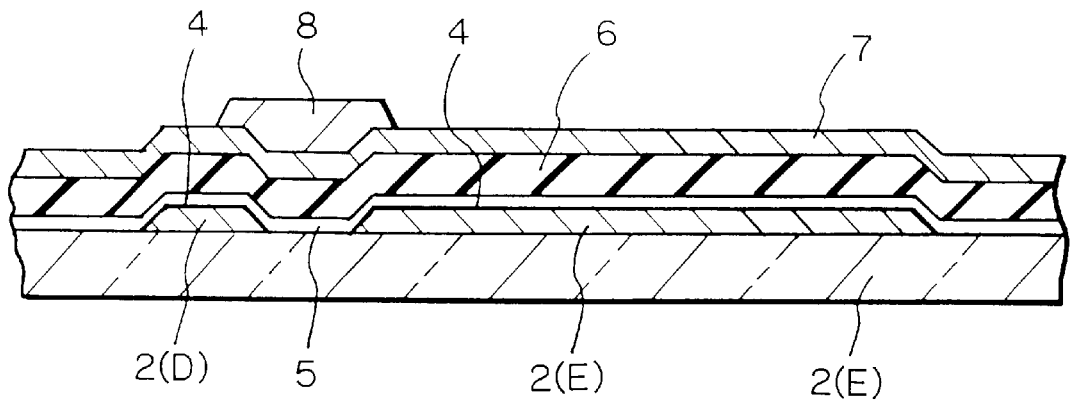
Figure 12E:
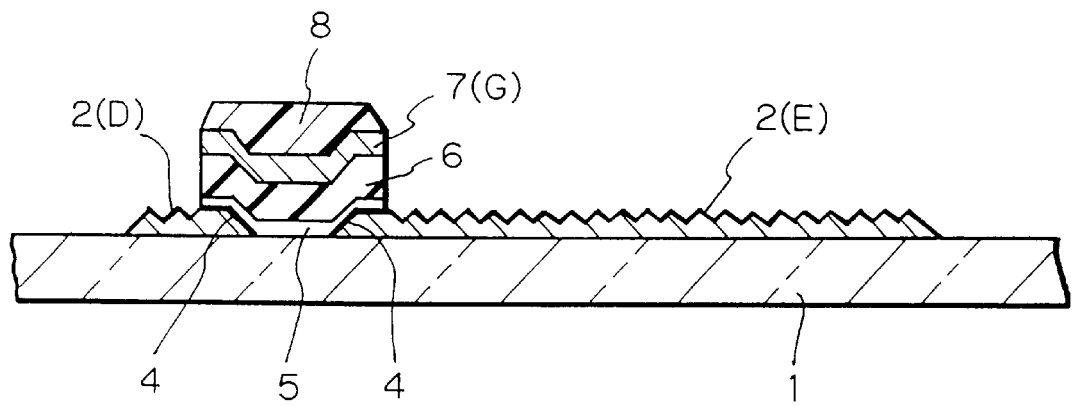
Figure 12F:
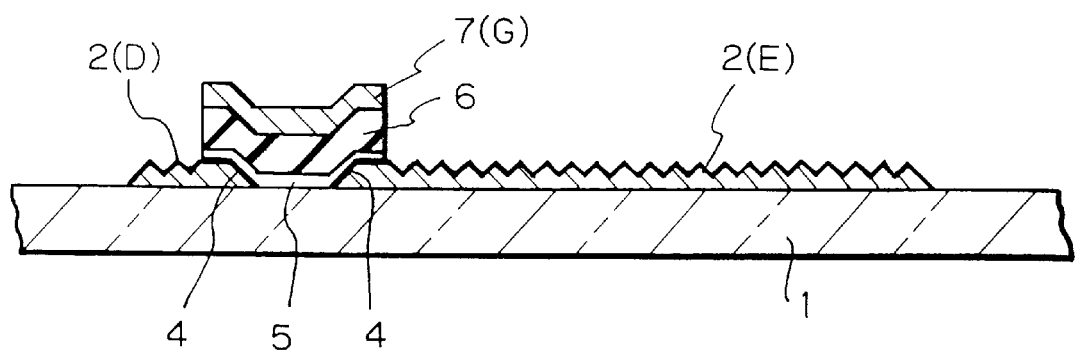

Also, at a step as illustrated in FIG. 12E, the aluminum alloy layer 2 is etched by a dry etching process using $Cl_2$ gas and $H_2$ gas, to make the surface of the aluminum alloy layer 2 uneven. Note that this dry etching process can be sequentially carried out with the dry etching process for etching the silicon nitride layer 6, the amorphous silicon layer 5 and the N+-type amorphous silicon layer 4.

Figure 12G:
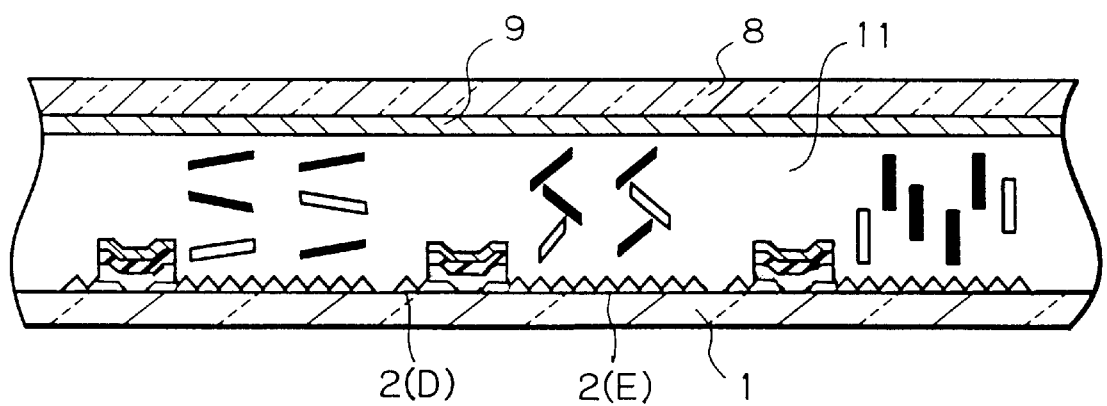

Finally, referring to FIG. 12G, the same operation as in a step illustrated in FIG. 11G is carried out.

Even in the seventh embodiment, the formation of a light scattering means on the counter glass substrate 8 is unnecessary, which reduces the manufacturing cost.

An eighth embodiment of the method for manufacturing a reflective LCD apparatus according to the present invention will be explained next with reference to FIGS. 13A through 13G. Note that the eighth embodiment is a modification of the second embodiment as illustrated in FIGS. 3A through 3G.

Figure 13A:
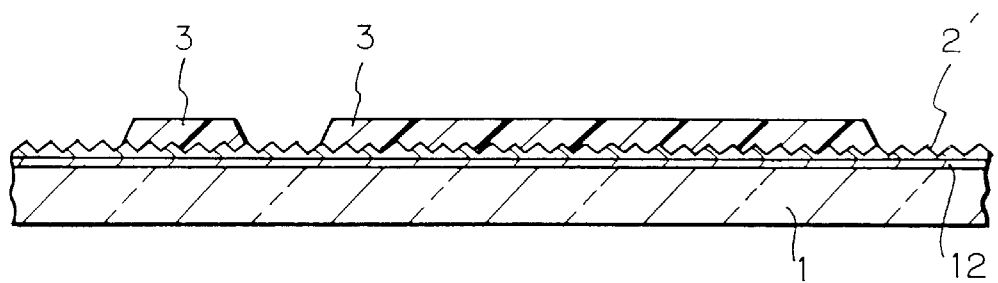
FIGS. 13A through 13G are cross-sectional views illustrating an eighth embodiment of the reflective LCD apparatus according to the present invention.
Figure 13B:
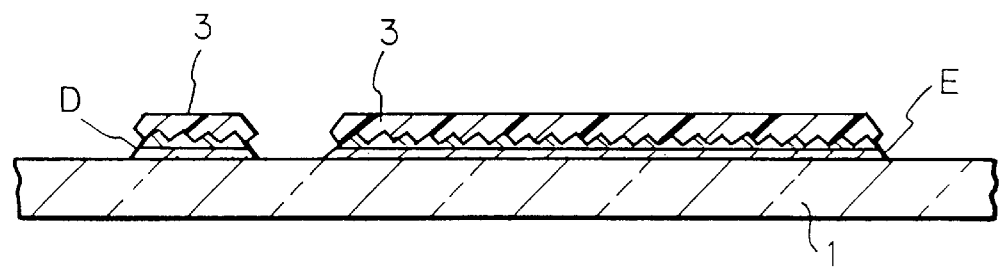
Figure 13C:
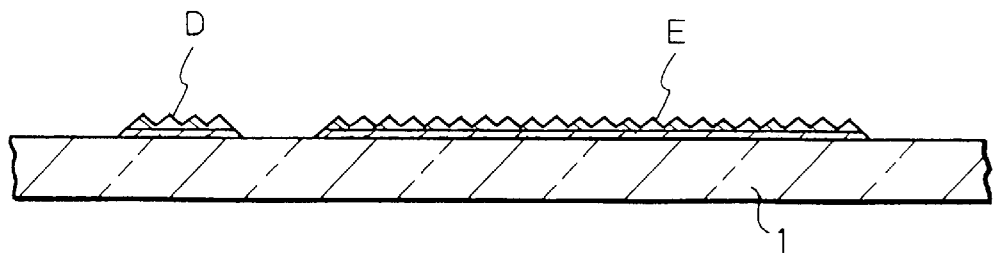
Figure 13D:
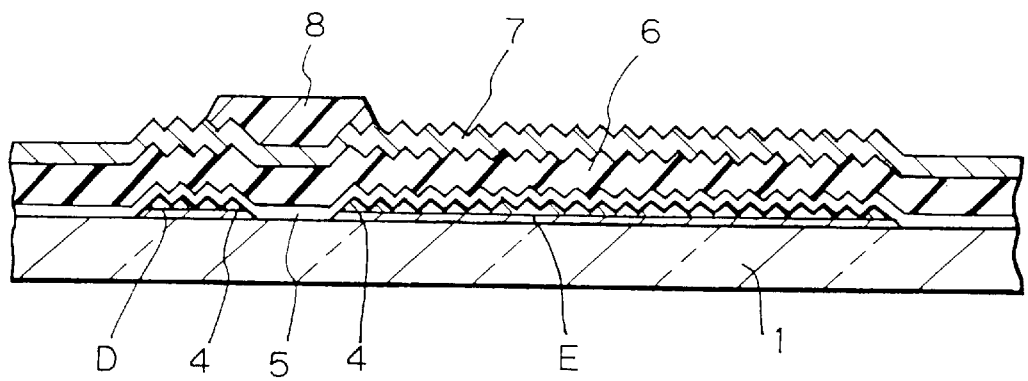
Figure 13E:
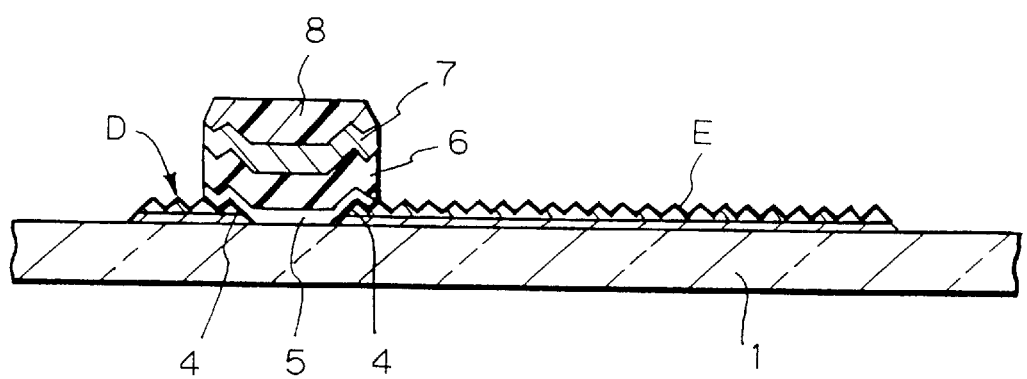
Figure 13F:
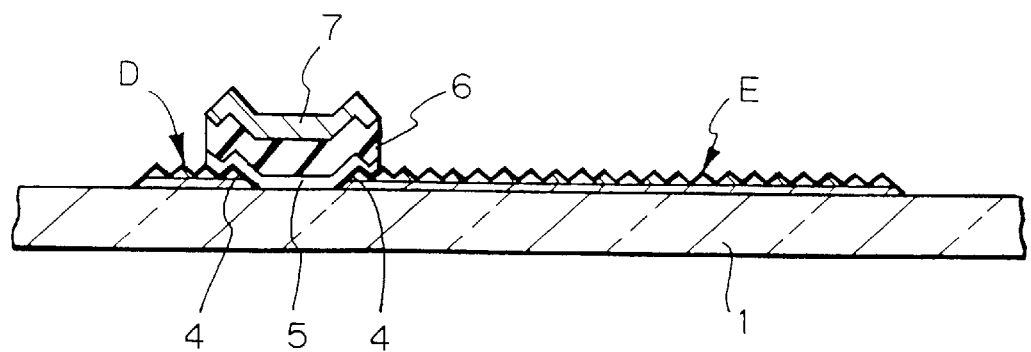

First, referring to FIG. 13A, an about 200 nm thick Mo layer 12 is deposited by a sputtering process on a glass substrate 1. Then, an about 80 nm thick Al—Si alloy layer 2' is deposited by a sputtering process at a substrate temperature higher than 150° C. on the Mo layer 12. As a result, the surface of the aluminum alloy layer 2' is made uneven and turbid as aluminum crystal grains grow. Thus, the aluminum alloy layer 2' can serve as light scattering means as well as light reflecting means. Then, a photoresist pattern 3 corresponding to a drain electrode and a source (pixel) electrode is formed by a photolithography process.

Next, referring to FIGS. 13B through 13F, the same operations as in the steps illustrated in FIGS. 3B through 3F are carried out.

Figure 13G:
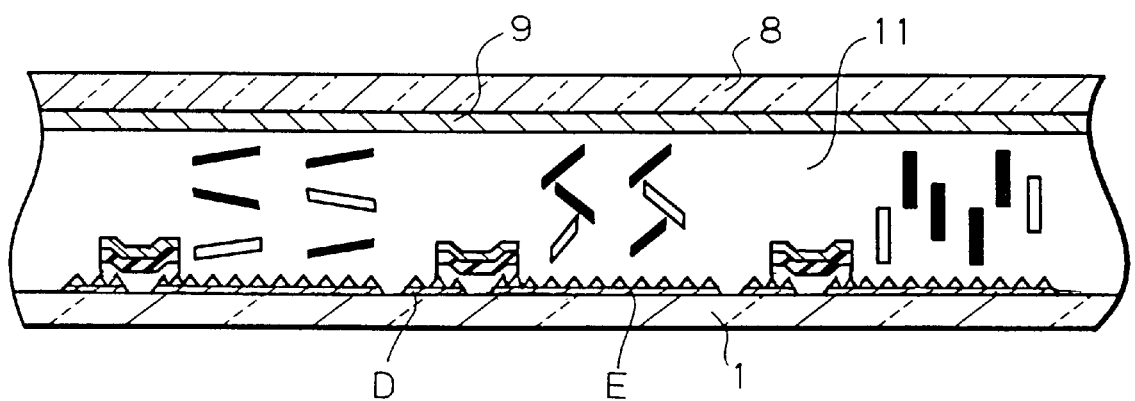

Finally, referring to FIG. 13G, a counter glass substrate 8 is prepared. In this case, the surfaces of the counter glass substrate 8 are both flat. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing. Then, the device is sealed by an ultraviolet-setting resin.

In the eighth embodiment the formation of a light scattering means on the counter glass substrate 8 is unnecessary, which reduces the manufacturing cost.

A ninth embodiment of the method for manufacturing a reflective LCD apparatus according to the present invention will be explained next with reference to FIGS. 14A through 14G. Note that the ninth embodiment is another modification of the second embodiment as illustrated in FIGS. 3A through 3G.

Referring to FIGS. 14A through 14E, the same operations at the steps as illustrated in FIGS. 3A through 3E.

Figure 14A:
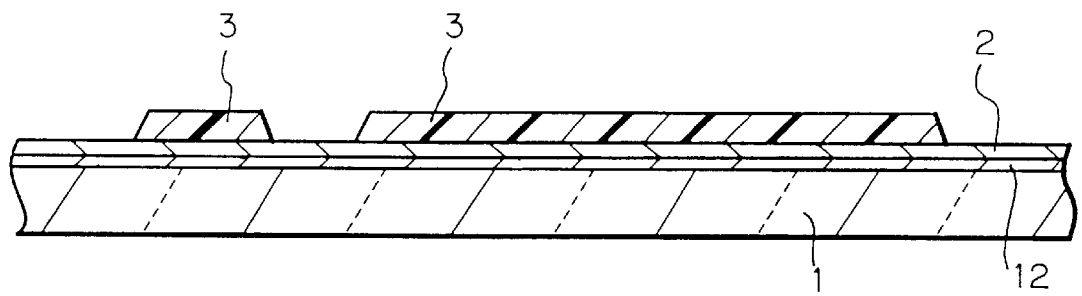
FIGS. 14A through 14G are cross-sectional views illustrating a ninth embodiment of the reflective LCD apparatus according to the present invention.
Figure 14B:
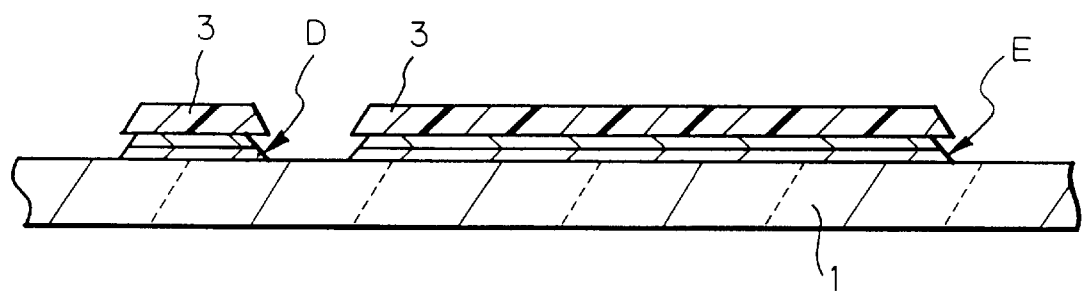
Figure 14C:
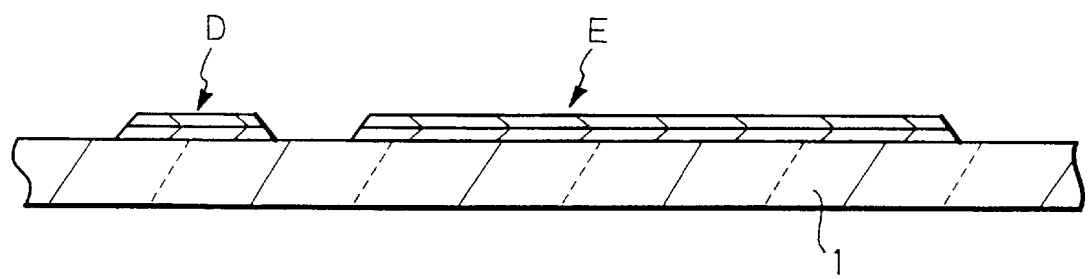
Figure 14D:
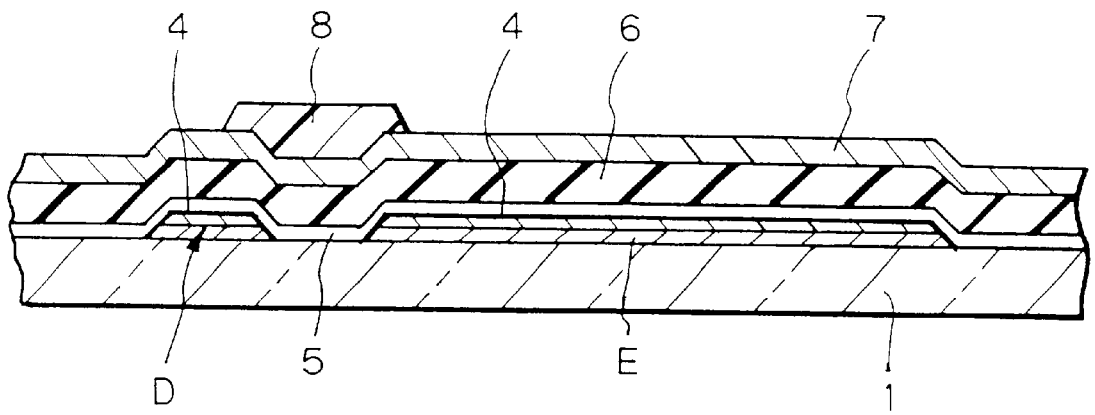
Figure 14E:
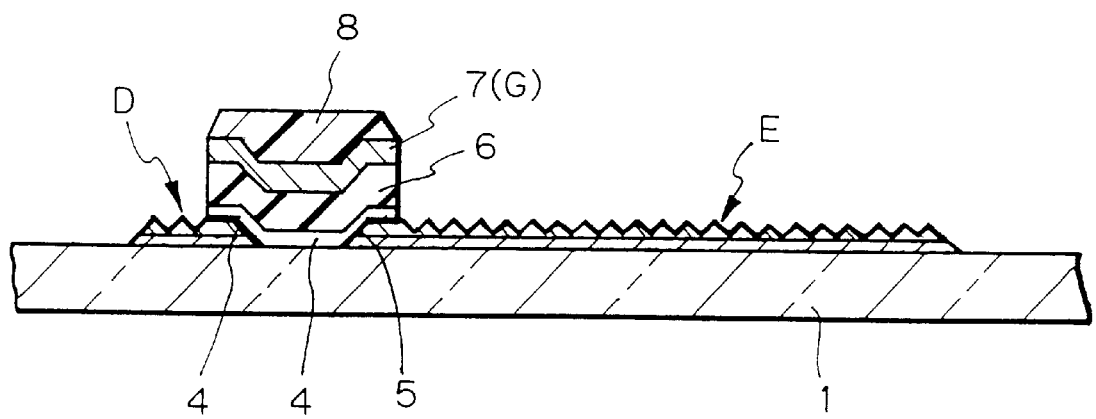
Figure 14F:
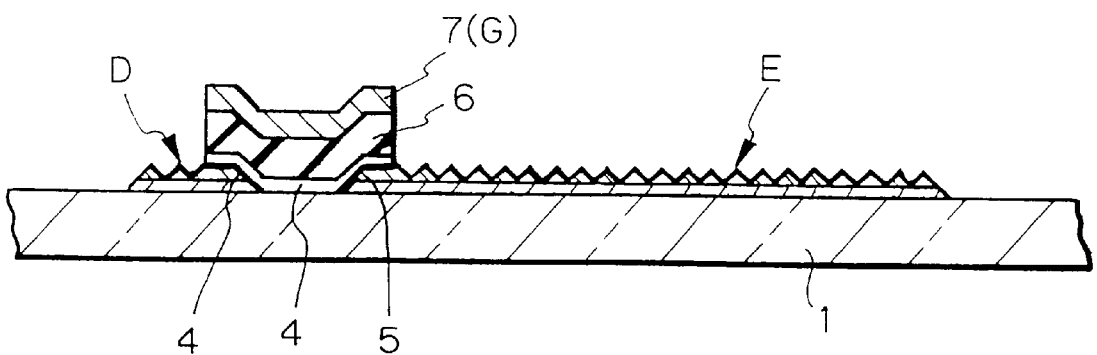

Also, at a step as illustrated in FIG. 14E, the aluminum alloy layer 2 is etched by a dry etching process using $Cl_2$ gas and $H_2$ gas, to make the surface of the aluminum alloy layer 2 uneven. Note that this dry etching process can be sequentially carried out with the dry etching process for etching the silicon nitride layer 6, the amorphous silicon layer 5 and the $N^+$-type amorphous silicon layer 4.

Figure 14G:
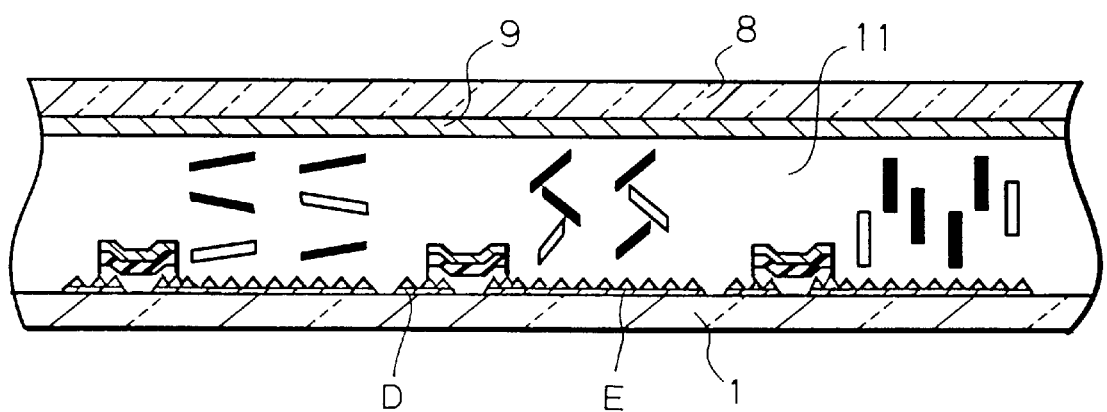

Finally, referring to FIG. 14G, the same operation as in a step illustrated in FIG. 13G is carried out.

Even in the ninth embodiment, the formation of a light scattering means on the counter glass substrate 8 is unnecessary, which reduces the manufacturing cost.

A tenth embodiment of the method for manufacturing a reflective LCD apparatus according to the present invention will be explained next with reference to FIGS. 15A through 15G. Note that the tenth embodiment is a modification of the third embodiment as illustrated in FIGS. 4A through 4G.

Figure 15A:
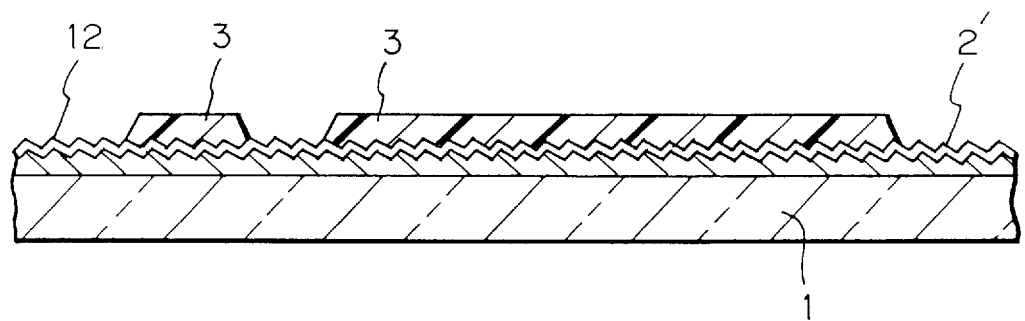
FIGS. 15A through 15G are cross-sectional views illustrating a tenth embodiment of the reflective LCD apparatus according to the present invention.
Figure 15B:
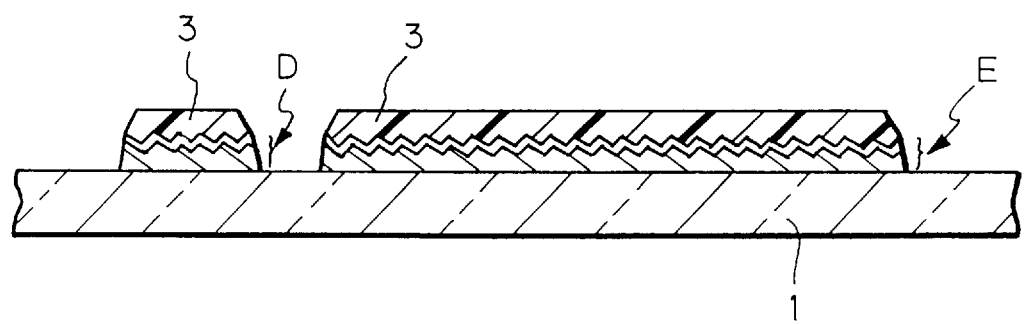
Figure 15C:
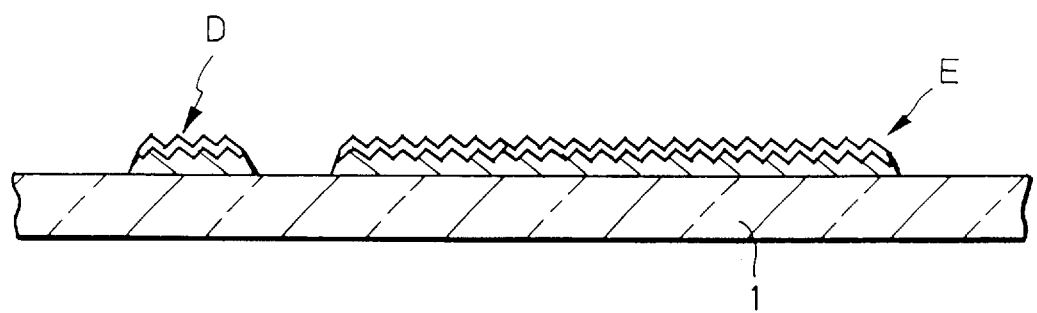
Figure 15D:
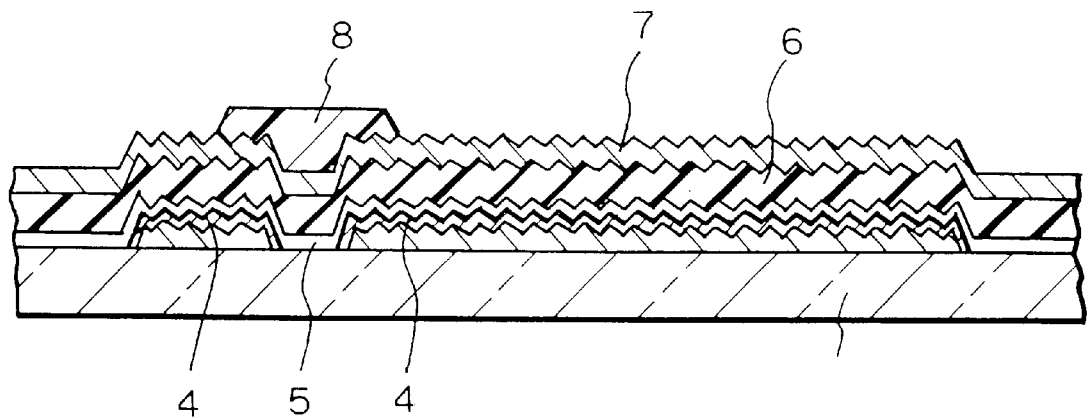
Figure 15E:
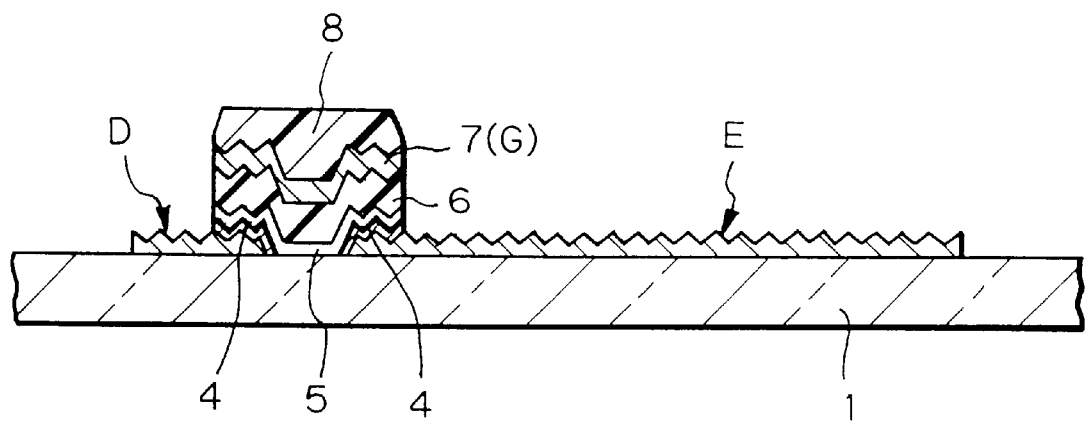
Figure 15F:
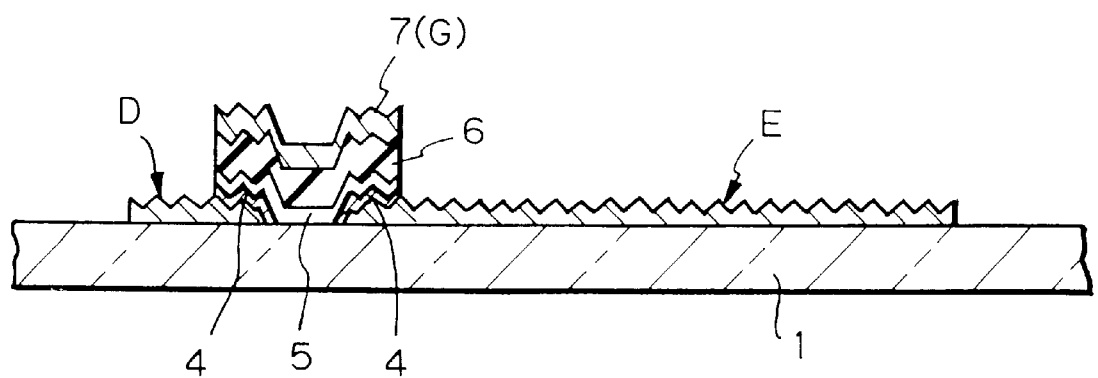

First, referring to FIG. 15A, an about 80 nm thick Al—Si alloy layer 2' is deposited by a sputtering process at a substrate temperature higher than 150° C. on a glass substrate 1. Then, an about 20 nm thick Mo layer 12 on the aluminum alloy layer 2'. As a result, the surface of the aluminum alloy layer 2' is made uneven and turbid as aluminum crystal grains grow. Thus, since the MO layer 12 will be removed at a later stage, the aluminum alloy layer 2' can serve as light scattering means as well as light reflecting means. Then, a photoresist pattern 3 corresponding to a drain electrode and a source (pixel) electrode is formed by a photolithography process.

Next, referring to FIGS. 15B through 15F, the same operations as in the steps illustrated in FIGS. 3B through 3F are carried out.

Figure 15G:
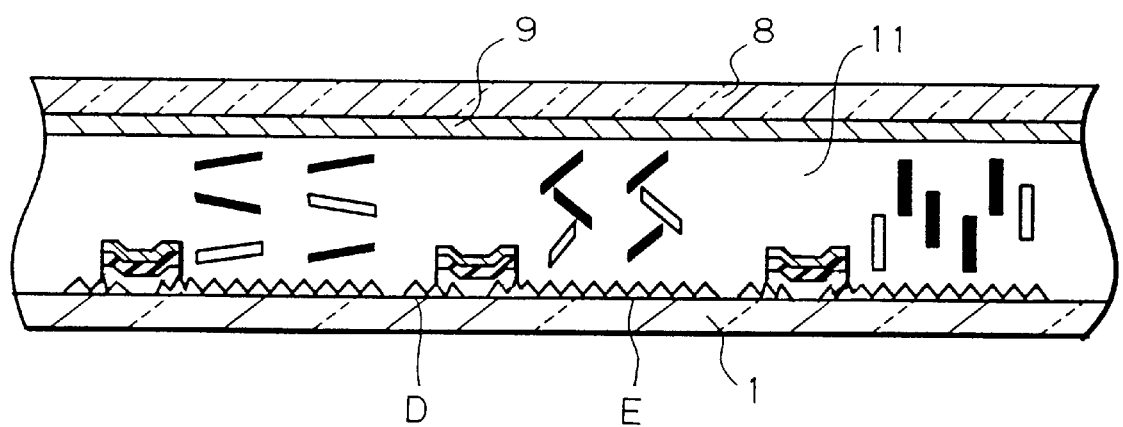

Finally, referring to FIG. 15G, a counter glass substrate 8 is prepared. In this case, the surfaces of the counter glass substrate 8 are both flat. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing, and the device is sealed by an ultraviolet-setting resin.

Also, in the tenth embodiment the formation of a light scattering means on the counter glass substrate 8 is unnecessary, which reduces the manufacturing cost.

An eleventh embodiment of the method for manufacturing a reflective LCD apparatus according to the present invention will be explained next with reference to FIGS. 16A through 16G. Note that the eleventh embodiment is another modification of the third embodiment as illustrated in FIGS. 4A through 4G.

Referring to FIGS. 16A through 16E, the same operations as in the steps illustrated in FIGS. 4A through 4E are carried out.

Figure 16A:
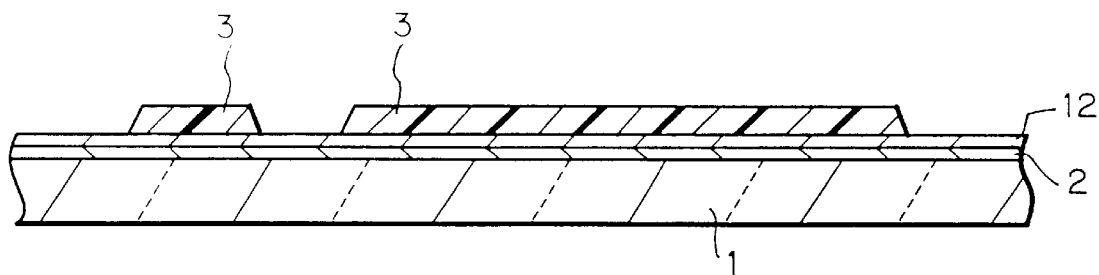
FIGS. 16A through 16G are cross-sectional views illustrating an eleventh embodiment of the reflective LCD apparatus according to the present invention.
Figure 16B:
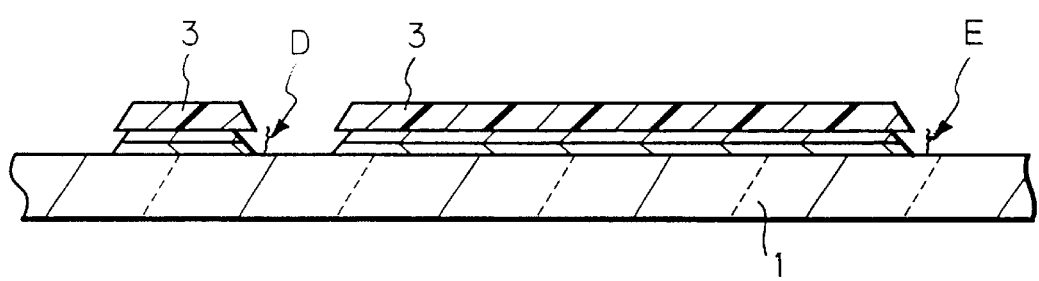
Figure 16C:
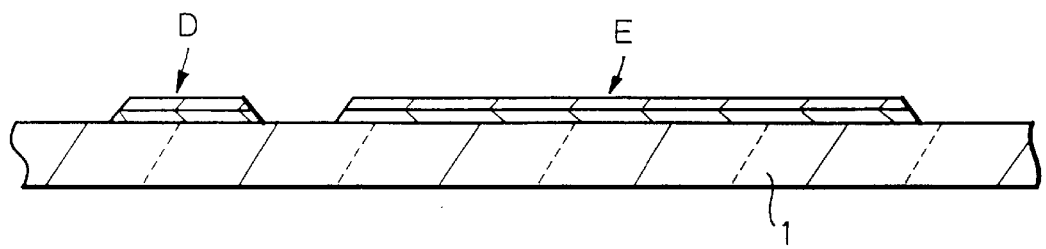
Figure 16D:
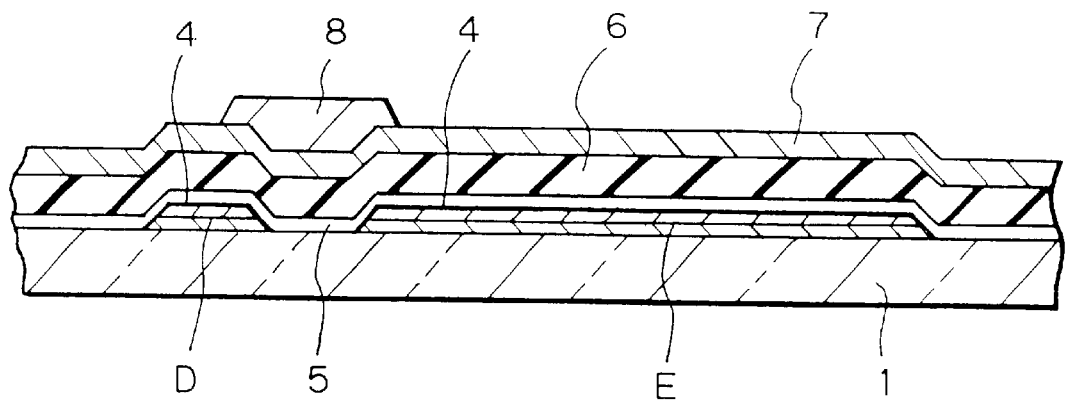
Figure 16E:
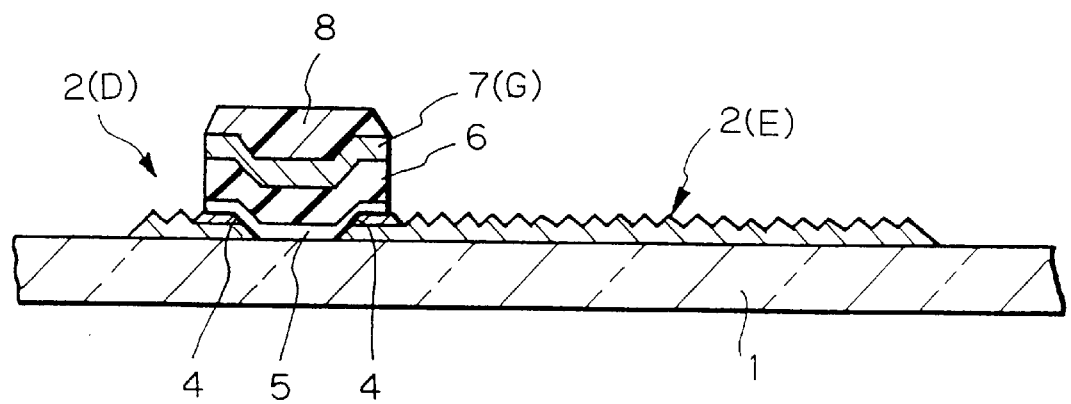
Figure 16F:
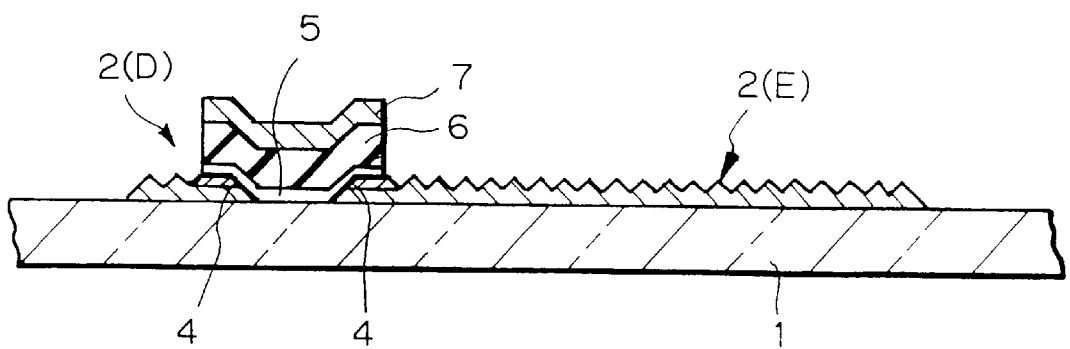

Also, at a step as illustrated in FIG. 16E, the aluminum alloy layer 2 is etched by a dry etching process using $Cl_2$ gas and $H_2$ gas, to make the surface of the aluminum alloy layer 2 uneven. Note that this dry etching process can be sequentially carried out with the dry etching process for etching the silicon nitride layer 6, the amorphous silicon layer 5 and the $N^+$-type amorphous silicon layer 4.

Figure 16G:
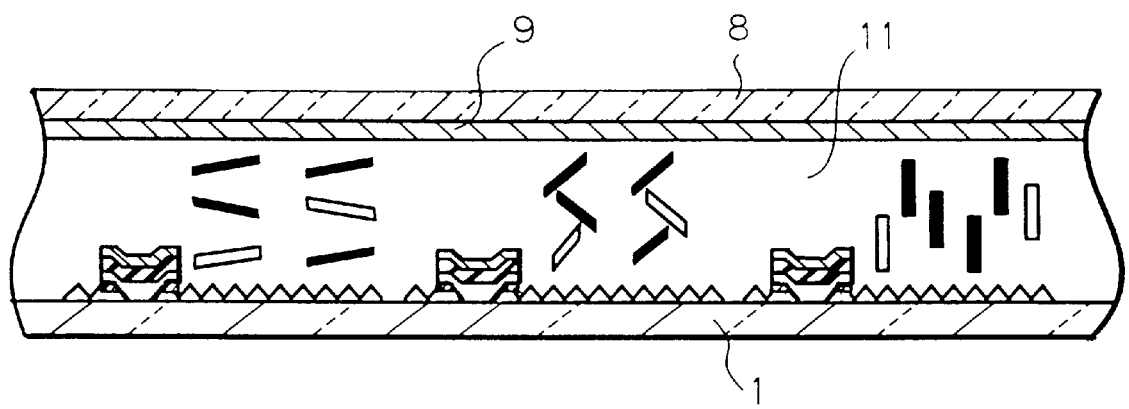

Finally, referring to FIG. 16G, the same operation as in a step illustrated in FIG. 15G is carried out.

Even in the eleventh embodiment, the formation of a light scattering means on the counter glass substrate 8 is unnecessary, which reduces the manufacturing cost.

A twelfth embodiment of the method for manufacturing a reflective LCD apparatus according to the present invention will be explained next with reference to FIGS. 17A through 17G. Note that the twelfth embodiment is a modification of the fourth embodiment as illustrated in FIGS. 5A through 5G.

Figure 17A:
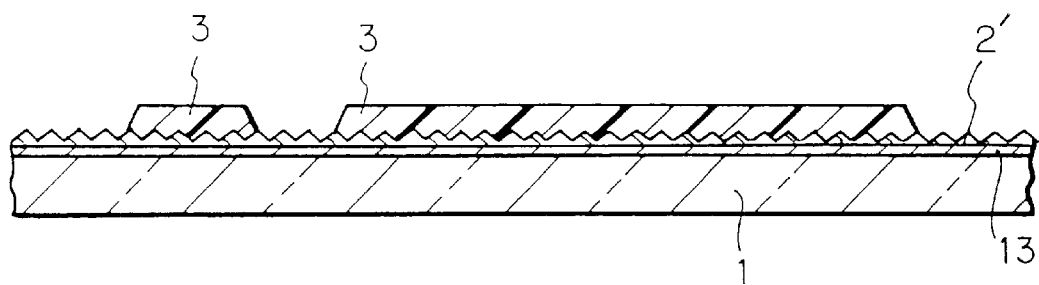
FIGS. 17A through 17G are cross-sectional views illustrating a twelfth embodiment of the reflective LCD apparatus according to the present invention.
Figure 17B:
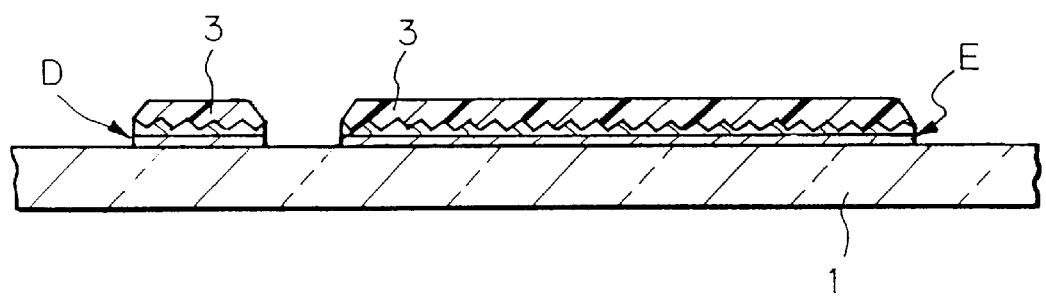
Figure 17C:
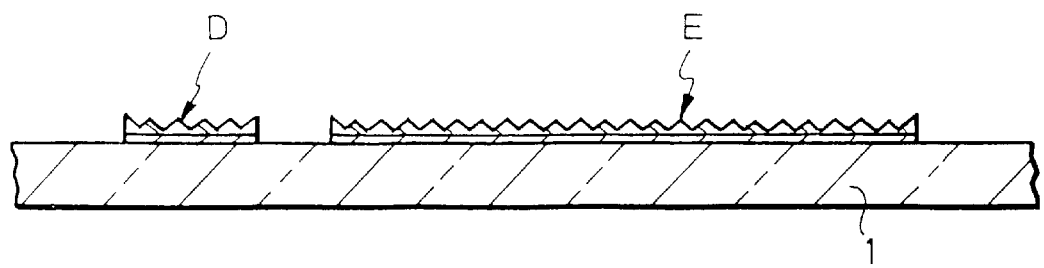
Figure 17D:
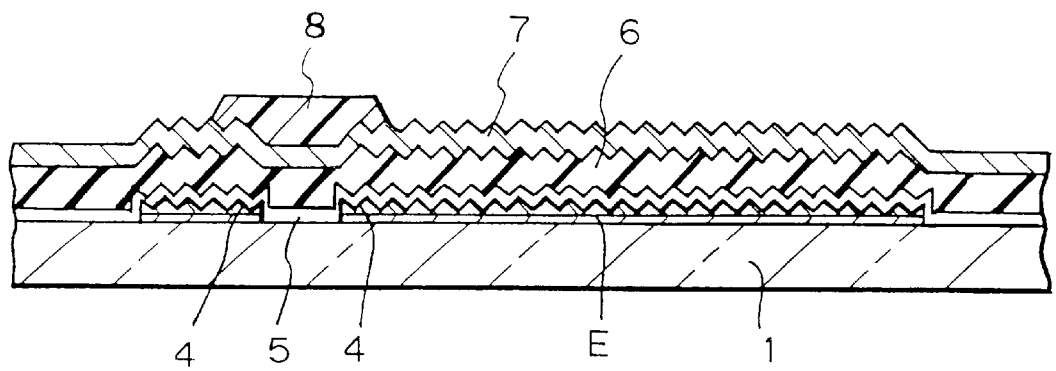
Figure 17E:
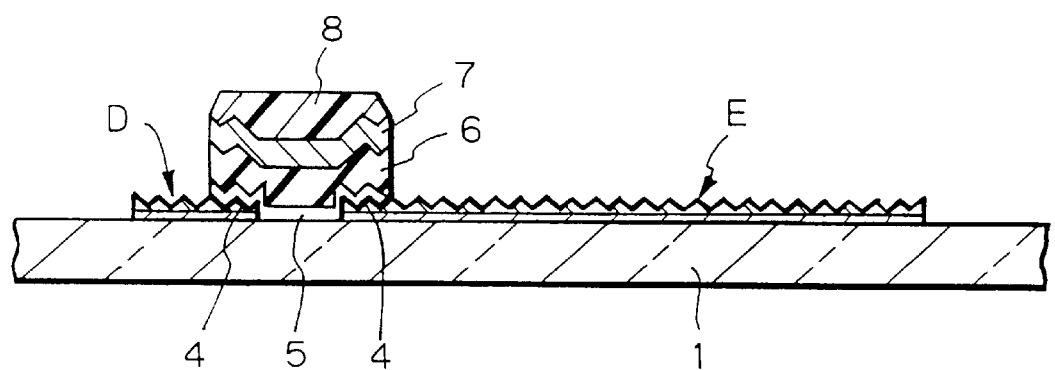
Figure 17F:
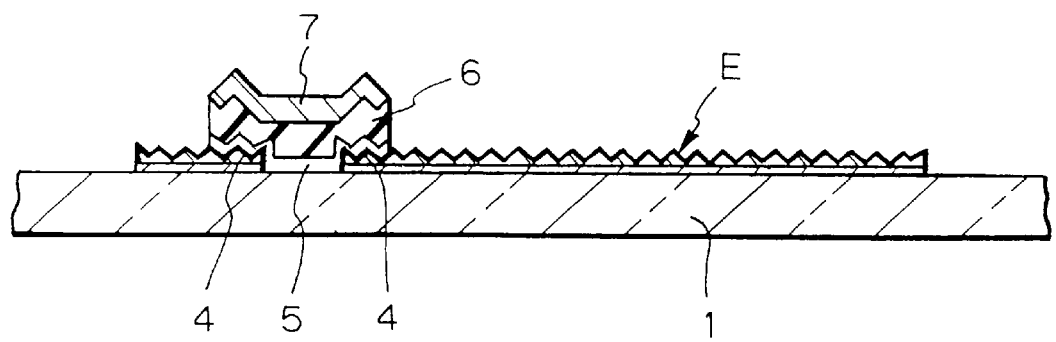

First, referring to FIG. 17A, an about 20 nm thick ITO layer 13 is deposited by a sputtering process on a glass substrate 1. Then, an about 80 nm thick Al—Si alloy layer 2' is deposited by a sputtering process at a substrate temperature higher than 150° C. on the ITO layer 13. As a result, the surface of the aluminum alloy layer 2' is made uneven and turbid as aluminum crystal grains grow. Thus, the aluminum alloy layer 2' can serve as light scattering means as will be light reflecting means. Then, a photoresist pattern 3 corresponding to a drain electrode and a source (pixel) electrode is formed by a photolithography process.

Next, referring to FIGS. 17B through 17F, the same operations as in the steps illustrated in FIGS. 5B through 5F are carried out.

Figure 17G:
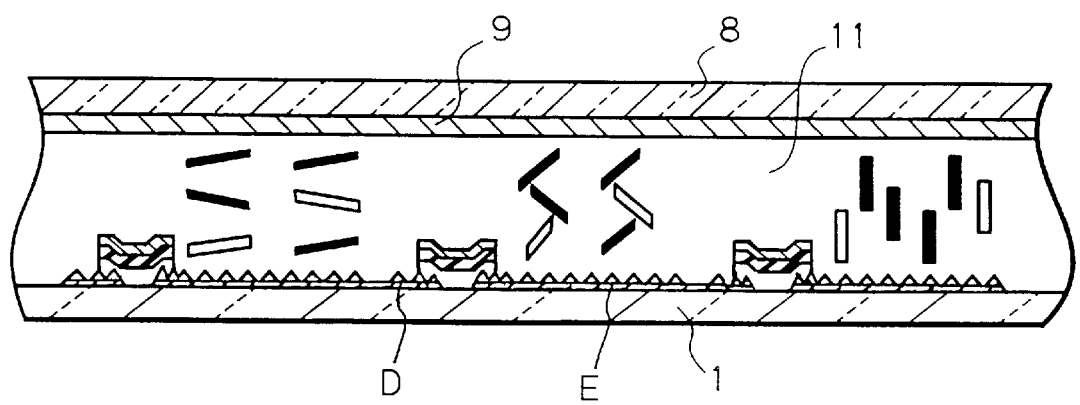

Finally, referring to FIG. 17G, a counter glass substrate 8 is prepared. In this case, the surfaces of the counter glass substrate 8 are both flat. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing. Then, the device is sealed by an ultraviolet-setting resin.

Even in the twelfth embodiment the formation of a light scattering means on the counter glass substrate 8 is unnecessary, which reduces the manufacturing cost.

A thirteenth embodiment of the method for manufacturing a reflective LCD apparatus according to the present invention will be explained next with reference to FIGS. 18A through 18G. Note that the thirteenth embodiment is another modification of the fourth embodiment as illustrated in FIGS. 5A through 5G.

Referring to FIGS. 18A through 18E, the same operations as in the steps illustrated in FIGS. 5A through 5E are carried out.

Figure 18A:
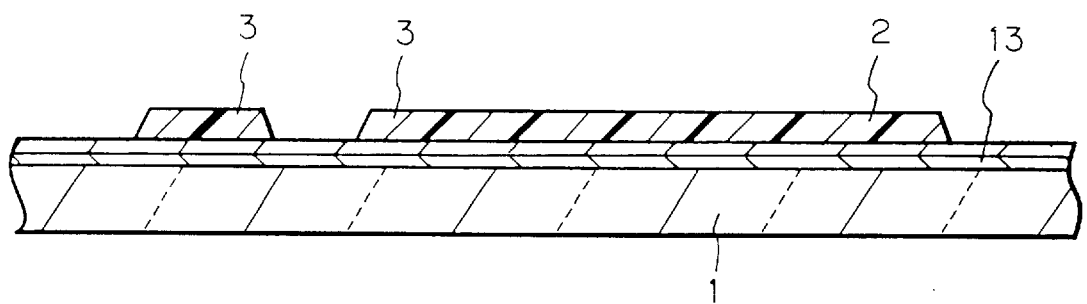
FIGS. 18A through 18G are cross-sectional views illustrating a thirteenth embodiment of the reflective LCD apparatus according to the present invention.
Figure 18B:
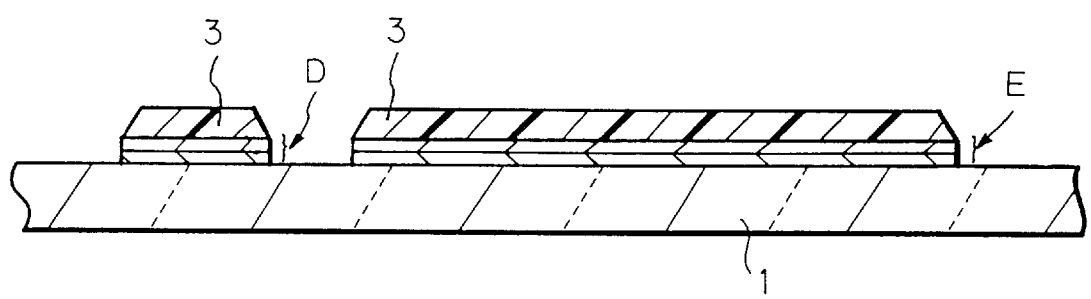
Figure 18C:
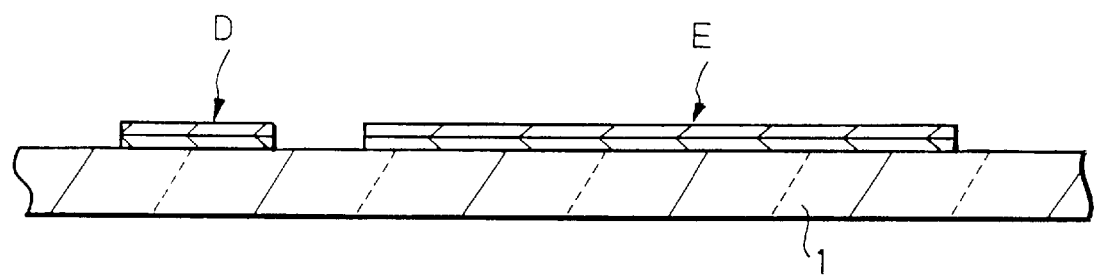
Figure 18D:
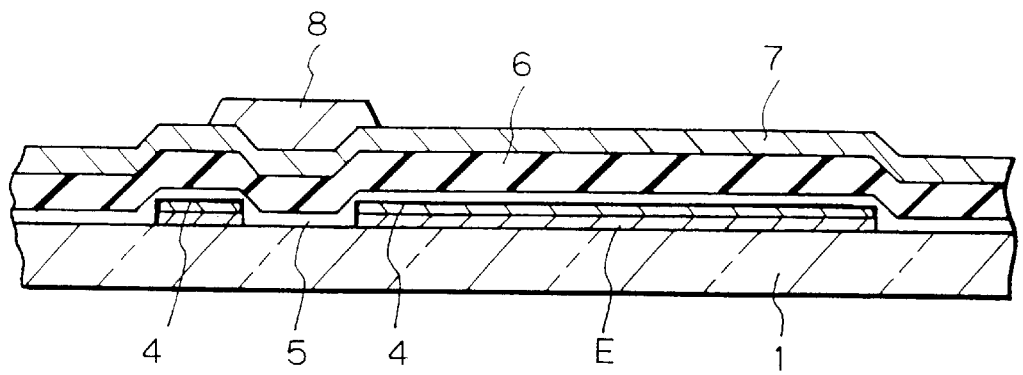
Figure 18E:
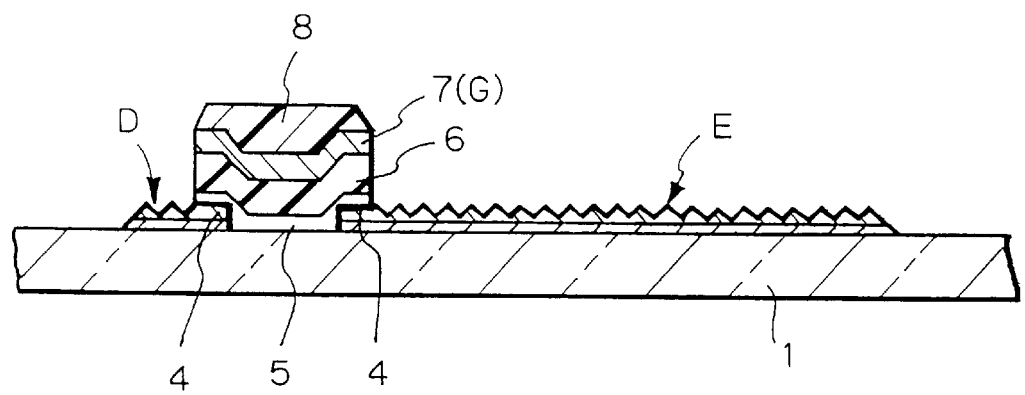
Figure 18F:
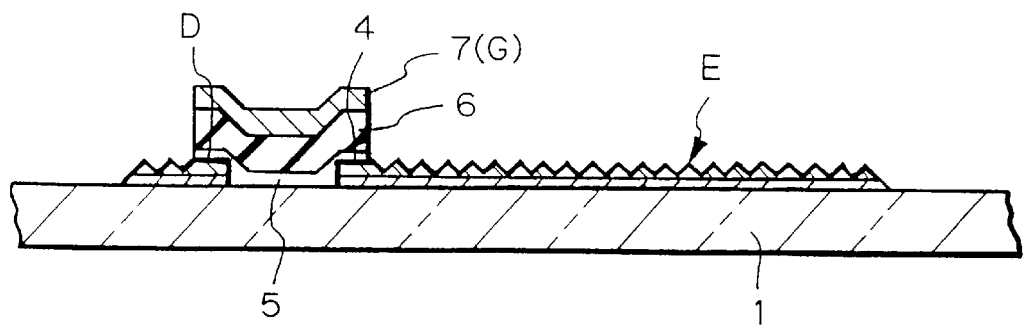

Also, at the step as illustrated in FIG. 18E, the aluminum alloy layer 2 is etched by a dry etching process using $Cl_2$ gas and H$_2$ gas, to make the surface of the aluminum alloy layer 2 uneven. Note that this dry etching process can be sequentially carried out with the dry etching process for etching the silicon nitride layer 6, the amorphous silicon layer 5 and the N$^+$-type amorphous silicon layer 4.

Figure 18G:
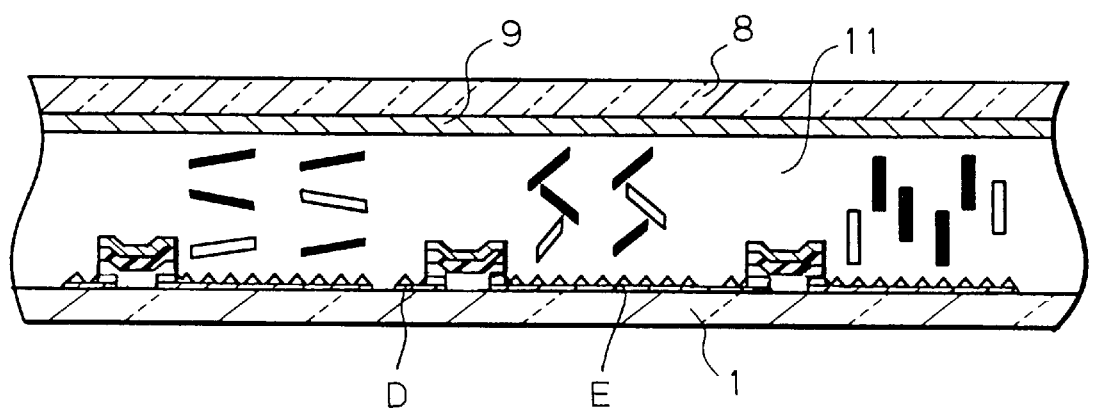

Finally, referring to FIG. 18G, the same operation as in the step illustrated in FIG. 13G is carried out.

Even in the thirteenth embodiment, the formation of a light scattering means on the counter glass substrate 8 is unnecessary, which reduces the manufacturing cost.

A fourteenth embodiment of the method for manufacturing a reflective LCD apparatus according to the present invention will be explained next with reference to FIGS. 19A through 19G. Note that the fourteenth embodiment is a modification of the fifth embodiment as illustrated in FIGS. 6A through 6G.

Figure 19A:
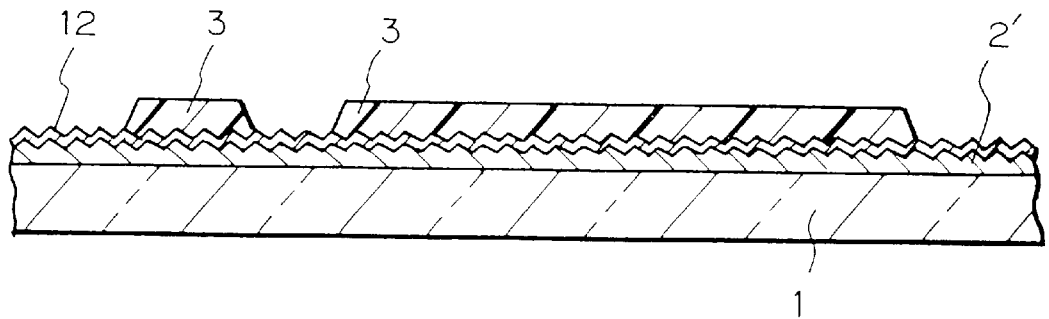
FIGS. 19A through 19G are cross-sectional views illustrating a fourteenth embodiment of the reflective LCD apparatus according to the present invention.
Figure 19B:
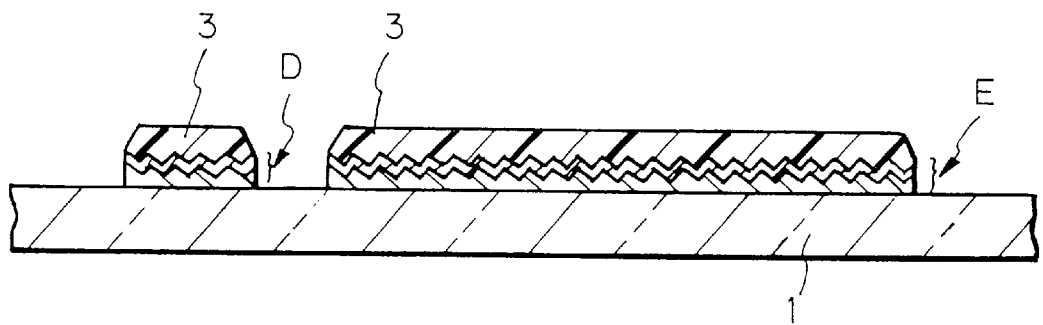
Figure 19C:
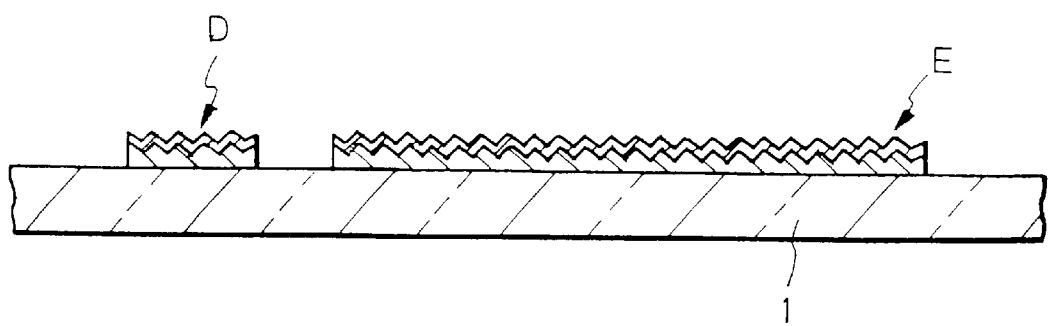
Figure 19D:
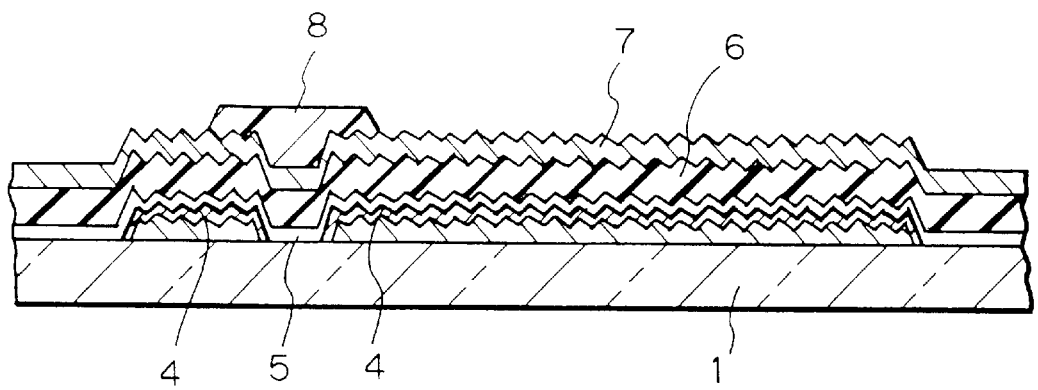
Figure 19E:
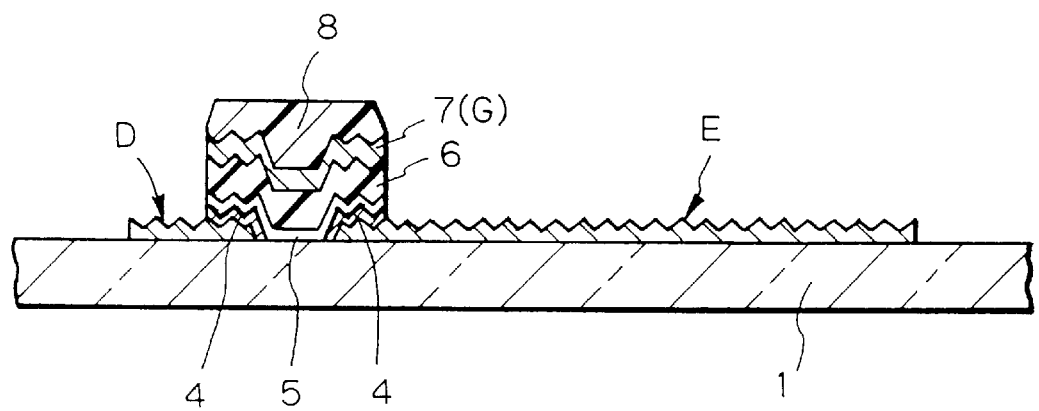
Figure 19F:
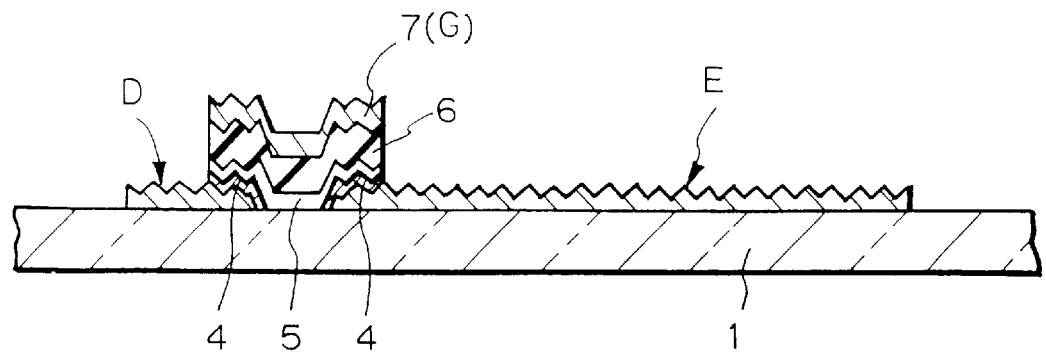

First, referring to FIG. 19A, an about 80 nm thick Al—Si alloy layer 2' is deposited by a sputtering process at a substrate temperature higher than 150° C. on a glass substrate 1. Then, an about 20 nm thick ITO layer 13 is formed on the aluminum alloy layer 2'. As a result, the surface of the aluminum alloy layer 2' is made uneven and turbid as aluminum crystal grains grow. Thus, the aluminum alloy layer 2' can serve as light scattering means as well as light reflecting means. Then, a photoresist pattern 3 corresponding to a drain electrode and a source (pixel) electrode is formed by a photolithography process.

Next, referring to FIGS. 19B through 19F, the same operations as in the steps illustrated in FIGS. 6B through 6F are carried out.

Figure 19G:
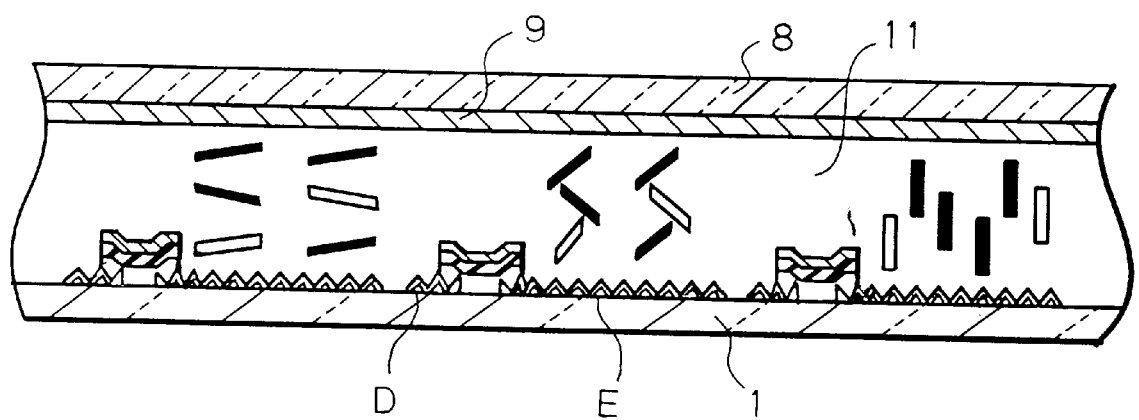

Finally, referring to FIG. 19G, a counter glass substrate 8 is prepared. In this case, the surfaces of the counter glass substrate 8 are both flat. Then, a transparent common electrode 9 is formed on the glass substrate 8. Then, after orientation processes including orientation layer coating processes and rubbing processes are performed upon the two substrates 1 and 8, the two glass substrates 1 and 8 are attached to each other with a predetermined spacing therebetween defined by plastic spacers (not shown). Then, the sides of the two glass substrates 1 and 8 are adhered to each other by epoxy adhesives, and then, a guest-host liquid crystal layer 11 is inserted into this spacing. Then, the device is sealed by an ultraviolet-setting resin.

Also, in the fourteenth embodiment the formation of a light scattering means on the counter glass substrate 8 is unnecessary, which reduces the manufacturing cost.

As explained hereinabove, according to the present invention, since a drain electrode and a pixel electrode made of aluminum alloy can be simultaneously formed, the number of photolithography and etching processes can be reduced, which reduces the manufacturing cost. Note that the number of photolithography and etching processes is 2 in the above-described embodiments.

In addition, since a TFT adopts a staggered type, the light shield for the TFT can be enhanced, which reduces a light OFF current.

In addition, since the drain electrode and the pixel electrode as well as a gate electrode are made of low conductive aluminum alloy, a signal delay can be suppressed even in a large scale LCD apparatus, which suppresses the deterioration of the display quality.

I claim:

1. A reflective liquid crystal apparatus comprising:
an insulating substrate;
a drain electrode, a source electrode, and a light reflecting pixel electrode, being formed on said insulating substrate by aluminum alloy, said source electrode and said light reflecting pixel electrode comprising a single aluminum alloy layer;
a non-doped semiconductor layer formed on a part of said drain electrode and a part of said source electrode;
an impurity-doped semiconductor layer formed between said drain electrode and said non-doped semiconductor layer and an impurity-doped semiconductor layer formed between said source electrode and said non-doped semiconductor layer;
a gate insulating layer formed on said non-doped semiconductor layer;
a gate electrode formed on said gate insulating layer;
a counter transparent insulating substrate;
a transparent common electrode formed on said counter transparent insulating substrate; and
a liquid crystal layer interposed between said insulating substrate on a side of said source electrode and said counter transparent insulating substrate on a side of said transparent common electrode.

2. The apparatus as set forth in claim 1, wherein at least one surface of said counter transparent insulating substrate is rough, forming a light scatterer.

3. The apparatus as set forth in claim 1, further comprising a light scatterer comprising a transparent insulating layer having a rough surface and being formed on said drain electrode, said source electrode and said gate electrode, so that said liquid crystal layer is interposed between said transparent insulating layer and said transparent common electrode.

4. The apparatus as set forth in claim 3, wherein said transparent insulating layer is made of photosensitive acrylic resin.

5. The apparatus as set forth in claim 3, wherein said transparent insulating layer is made of polyimide resin.

6. A reflective liquid crystal apparatus comprising:
an insulating substrate;
a drain electrode and a source electrode, being formed on said insulating substrate and being formed by an aluminum alloy layer, said source electrode serving as a light reflecting pixel electrode;
a non-doped semiconductor layer formed on a part of said drain electrode and a part of said source electrode;
an impurity-doped semiconductor layer formed between said drain electrode and said non-doped semiconductor layer and an impurity-doped semiconductor layer formed between said source electrode and said non-doped semiconductor layer;
a gate insulating layer formed on said non-doped semiconductor layer;
a gate electrode formed on said gate insulating layer;
a counter transparent insulating substrate;
a transparent common electrode formed on said counter insulating substrate;
a liquid crystal layer interposed between said insulating substrate on a side of said source electrode and said counter insulating substrate on a side of said transparent common electrode; and
a transparent insulating layer including light scattering particles and being formed on said drain electrode, said source electrode and said gate electrode, so that said liquid crystal layer is interposed between said transparent insulating layer and said transparent common electrode.

7. The apparatus as set forth in claim 6, wherein said transparent insulating layer is made of polyimide resin.

8. The apparatus as set forth in claim 1, wherein said aluminum alloy layer has an uneven and turbid surface, formed of disordered aluminum crystal grains, forming a light scatterer.

9. The apparatus as set forth in claim 1, wherein said aluminum alloy layer has an uneven and turbid surface formed of disordered aluminum crystal grains, outside of said non-doped semiconductor layer, forming a light scatterer.

10. The apparatus as set forth in claim 1, wherein said drain electrode and said source electrode are further formed by an ohmic contact layer formed between said aluminum alloy layer and said insulating substrate.

11. The apparatus as set forth in claim 10, wherein said ohmic contact layer is made of Mo.

12. The apparatus as set forth in claim 10, wherein said ohmic contact layer is made of indium tin oxide.

13. The apparatus as set forth in claim 1, wherein said drain electrode and said source electrode are further formed by an ohmic contact layer formed between said aluminum alloy layer and said impurity-doped semiconductor layers.

14. The apparatus as set forth in claim 13, wherein said ohmic contact layer is non-transparent, said ohmic contact layer being formed only under said impurity-doped semiconductor layers.

15. The apparatus as set forth in claim 14, wherein said ohmic contact layer is made of Mo.

16. The apparatus as set forth in claim 13, wherein said ohmic contact layer is transparent.

17. The apparatus as set forth in claim 16, wherein said ohmic contact layer is made of indium tin oxide.

18. The apparatus as set forth in claim 1, wherein said aluminum alloy layer is made of Al—Nd—Si.

19. The apparatus as set forth in claim 1, wherein said aluminum alloy layer is made of Al—Si.

* * * * *